(12) United States Patent
Sugiura

(10) Patent No.: US 7,609,957 B2
(45) Date of Patent: Oct. 27, 2009

(54) PHOTOGRAPHING LENS DRIVING CONTROL DEVICE

(75) Inventor: Koichi Sugiura, Yokohama (JP)

(73) Assignee: Ricoh Company, Ltd., Tokyo (JP)

(*) Notice: Subject to any disclaimer, the term of this patent is extended or adjusted under 35 U.S.C. 154(b) by 443 days.

(21) Appl. No.: 11/334,725

(22) Filed: Jan. 19, 2006

(65) Prior Publication Data

US 2006/0188242 A1    Aug. 24, 2006

(30) Foreign Application Priority Data

Feb. 18, 2005   (JP) ............................. 2005-042506

(51) Int. Cl.
    *G03B 17/00*   (2006.01)
(52) U.S. Cl. ........................ 396/86; 359/697
(58) Field of Classification Search ............. 396/72, 396/86, 93, 133, 135; 348/211.4; 359/697, 359/699

See application file for complete search history.

(56) References Cited

U.S. PATENT DOCUMENTS

| | | | | |
|---|---|---|---|---|
| 5,028,945 A * | 7/1991 | Kashihara et al. | ............. | 396/86 |
| 5,438,190 A * | 8/1995 | Kaneda et al. | ............. | 250/201.3 |
| 5,638,217 A * | 6/1997 | Hirasawa et al. | ............. | 359/698 |
| 5,854,711 A * | 12/1998 | Kaneda | ............. | 359/697 |
| 6,646,816 B2 * | 11/2003 | Hagimori | ............. | 396/85 |
| 6,661,585 B2 * | 12/2003 | Okawara | ............. | 359/697 |
| 6,680,804 B2 * | 1/2004 | Nomura et al. | ............. | 359/699 |

FOREIGN PATENT DOCUMENTS

| | | |
|---|---|---|
| JP | 6-160699 | 6/1994 |
| JP | 2565330 | 10/1996 |
| JP | 2565341 | 10/1996 |
| JP | 8-327877 | 12/1996 |
| JP | 2620940 | 4/1997 |
| JP | 2654775 | 5/1997 |
| JP | 2654776 | 5/1997 |
| JP | 2709456 | 10/1997 |
| JP | 2774832 | 4/1998 |
| JP | 2776482 | 5/1998 |
| JP | 2802896 | 7/1998 |
| JP | 2814238 | 8/1998 |
| JP | 2814239 | 8/1998 |
| JP | 2814240 | 8/1998 |
| JP | 2824766 | 9/1998 |
| JP | 2824767 | 9/1998 |
| JP | 2964384 | 8/1999 |
| JP | 11-264927 | 9/1999 |
| JP | 3208492 | 7/2001 |

(Continued)

*Primary Examiner*—Melissa J Koval
*Assistant Examiner*—Autumn Parker
(74) *Attorney, Agent, or Firm*—Oblon, Spivak, McClelland, Maier & Neustadt, L.L.P.

(57) ABSTRACT

A photographing lens driving control device includes a plurality of lens groups (1A-1C) having a magnification function, a plurality of lens driving devices (4A-4C), which drives the plurality of lens groups, and a control device (5A, 5B), which controls the plurality of lens driving devices, and when driving a lens group (1A) positioned in an object side of the plurality of lens groups, the control device adjusts a driving speed of another lens group (1B) depending on a position of the another lens group with respect to a position of the lens group positioned in the object side.

2 Claims, 18 Drawing Sheets

FOREIGN PATENT DOCUMENTS

| | | |
|---|---|---|
| JP | 2002-156572 | 5/2002 |
| JP | 2004-70176 | 3/2004 |
| JP | 3544775 | 4/2004 |
| JP | 2004-274515 | 9/2004 |
| JP | 2006-330657 | 12/2006 |

* cited by examiner

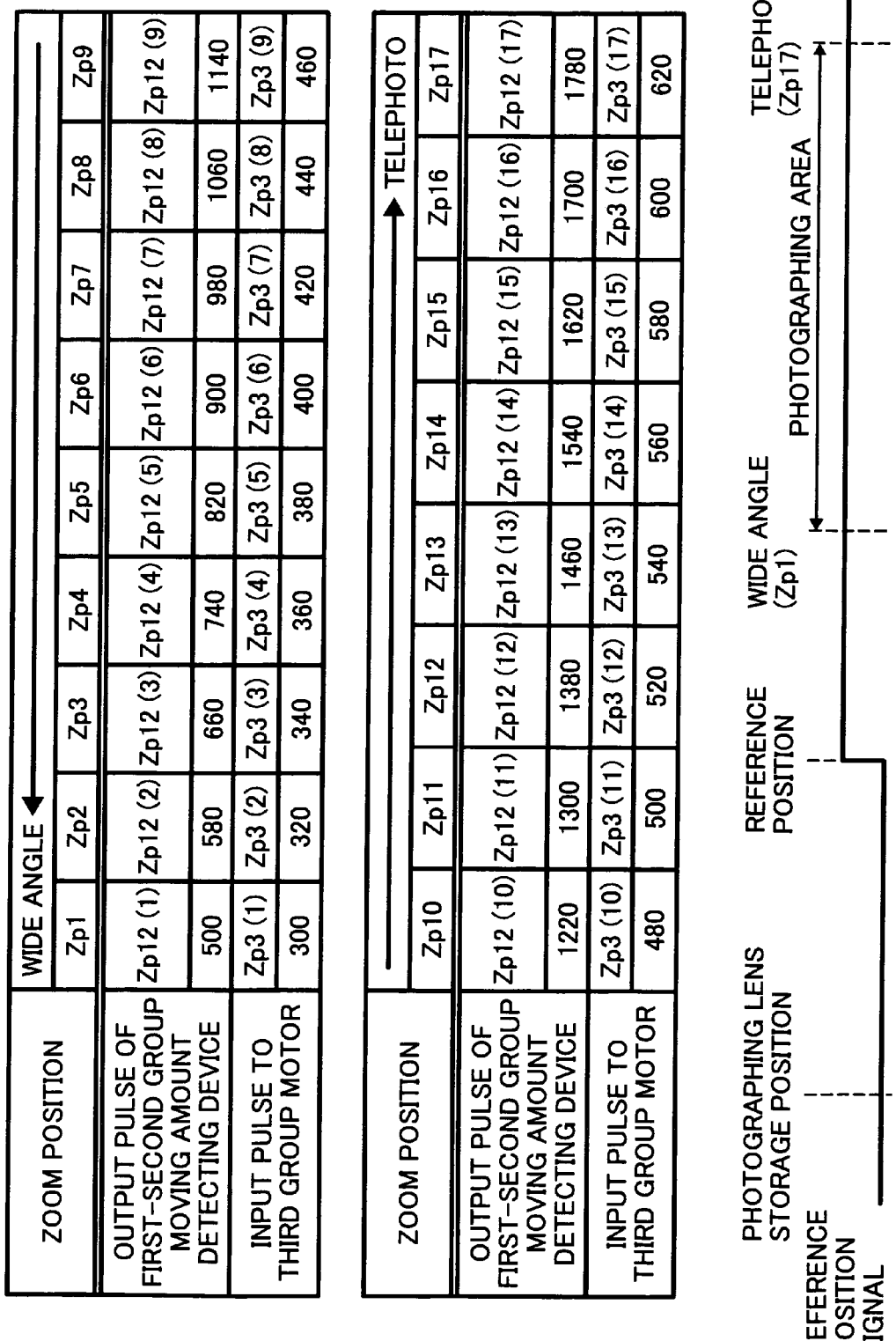

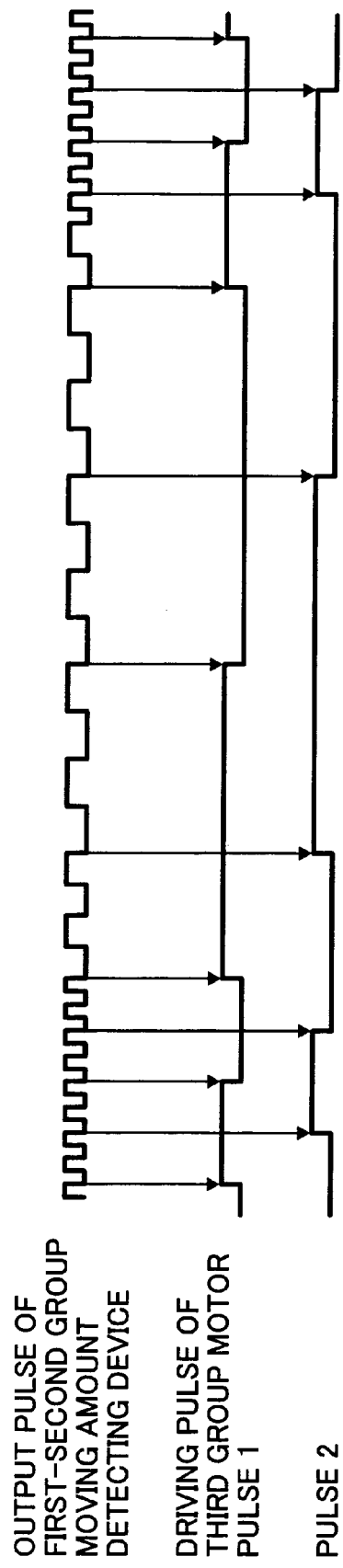

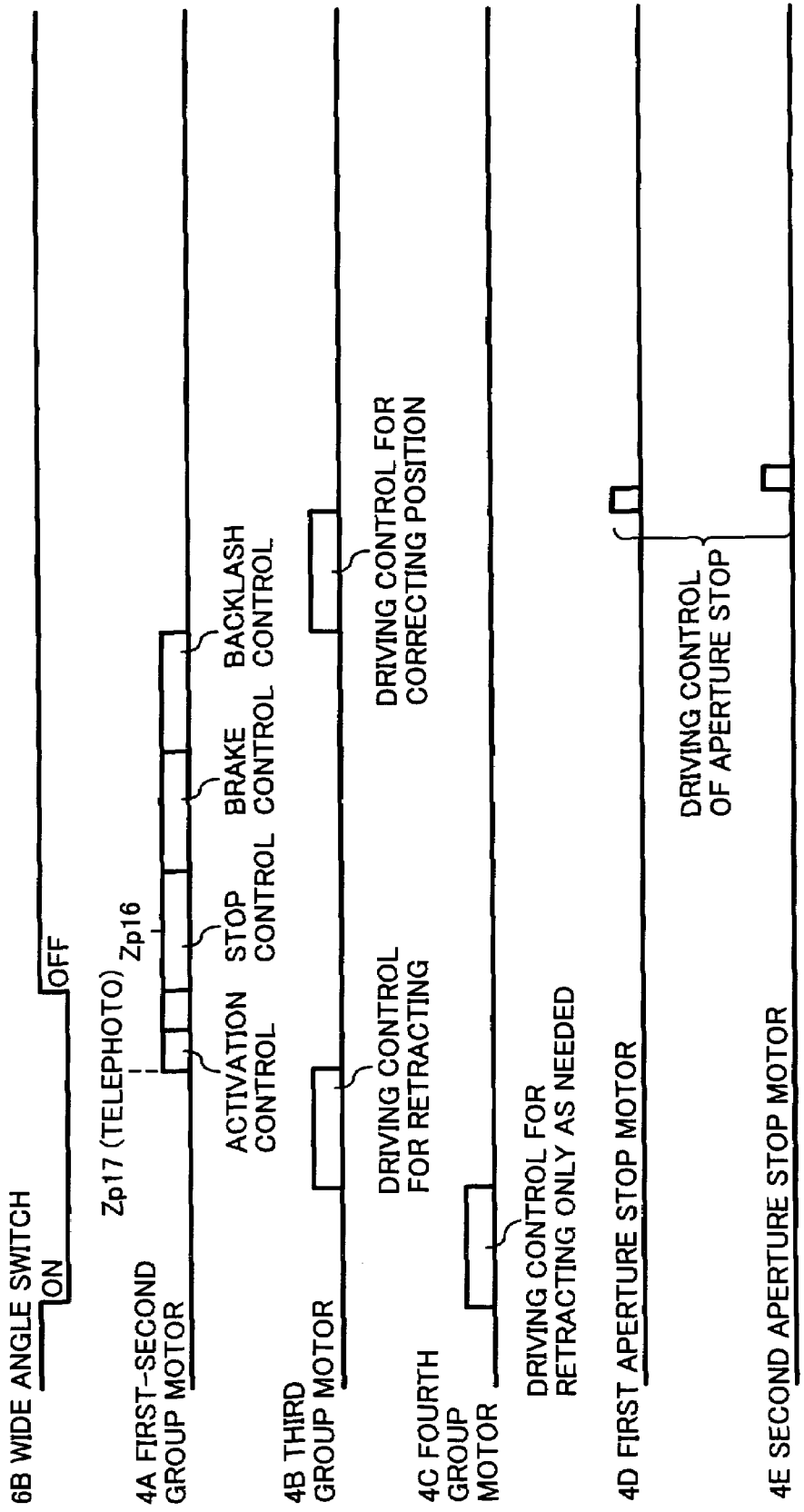

PHOTOGRAPHING LENS DRIVING CONTROL DEVICE

CLAIM OF PRIORITY

This application is based on, and claims the benefit of the filing date of, Japanese Patent Application No. 2005/042506 filed on Feb. 18, 2005, the entire contents of which are incorporated herein by reference.

BACKGROUND

1. Field of the Invention

The present invention relates to a photographing lens driving control device.

2. Related Art Statement

Generally, there have been cameras, provided with a so-called zoom lenses capable of changing a magnification of photographing as appropriate.

Such a zoom lens can change a photographing magnification between a telephoto state capable of photographing a subject at a distance with a magnification and a wide-angle state capable of photographing a wider subject.

In this case, the photographing magnification can be changed by combining a plurality of lens groups, each of the groups having one or more lens, and driving each of the lens groups in an optical axis direction.

When driving such lens groups, a photographing lens driving control device is generally used. The photographing lens driving control device is provided with a mechanical mechanism capable of changing the position of each of the lens groups, while interlocking the position of each of the lens groups. The mechanical mechanism is controlled by hand or a motor (for example, JP-A-H06-160699). However, such a photographing lens driving control device had a complicated structural problem because of the mechanical mechanism.

For the above photographing lens driving control device, there has been considered a photographing lens driving control device having a structure, which directly drives each of the lens groups by a motor, respectively, simpler than the mechanical mechanism.

In this case, each of the lens groups is provided on the same optical axis, so each of the lens groups may interfere when independently driving each of the lens groups back and forth along the optical axis.

In addition, when sequentially driving each of the lens groups at slightly different times, it takes a long time to achieve a target optical system. Therefore, when such a photographing lens driving control device is applied for a digital camera having a liquid crystal display, since an image through a normal lens is displayed on the liquid crystal display, an image out of focus is displayed for a long time, resulting in a deteriorated image.

SUMMARY

Therefore, the present invention has been made in view of the above circumstances, and an object of the present invention is to provide a photographing lens driving control device that can achieve a target optical system in a short time by simultaneously driving each of lens groups with a motor without generating an interference between each of the lens groups in a photographing lens comprising a plurality of lens groups.

In order to solve the above problems, a photographing lens driving control device according to a first aspect of the present invention comprises a plurality of lens groups having a magnification function, a plurality of lens driving devices, which drives the plurality of lens groups, and a control device, which controls the plurality of lens driving devices, wherein when driving a lens group positioned in an object side of the plurality of lens groups, the control device adjusts a driving speed of another lens group depending on a position of the another lens group with respect to a position of the lens group positioned in the object side.

A photographing lens driving control device according to a second aspect of the present invention comprises a plurality of lens groups having a magnification function, a plurality of lens driving devices, which drives the plurality of lens groups, and a control device, which controls the plurality of lens driving devices, wherein when driving a lens group positioned in an object side of the plurality of lens groups, the control device adjusts a driving speed of another lens group depending on a driving speed of the lens group positioned in the object side.

A photographing lens driving control device according to a third aspect of the present invention comprises a plurality of lens groups having a magnification function, a plurality of lens driving devices, which drives the plurality of lens groups, and a control device, which controls the plurality of lens driving device, wherein when driving a lens group positioned in an object side of the plurality of lens groups, the control device adjusts a driving amount of another lens group depending on a moving distance of the lens group positioned in the object side.

According to the first aspect of the present invention, when driving the lens group positioned in the object side, the driving speed of another lens group is adjusted depending on the position of another lens group with respect to the position of the lens group positioned in the object side. Thus, another lens group is driven such that the lens group positioned in the object side and another lens group does not interfere.

According to the second aspect of the present invention, when driving the lens group positioned in the object side, the driving speed of another lens group is adjusted depending on the driving speed of the lens group positioned in the object side. Thus, another lens group is driven such that the lens group positioned in the object side and another lens group does not interfere.

According to the third aspect of the present invention, when driving the lens group positioned in the object side, the driving amount of another lens group is adjusted depending on the moving distance of the lens group positioned in the object side. Thus, another lens group is driven such that the lens group positioned in the object side and another lens group does not interfere.

According to the above aspects of the present invention, since the lens group positioned in the object side and another lens group are simultaneously driven, the amount of time required to achieve a target optical system can be reduced.

According to the above aspects of the present invention, since each of the lens groups is driven by the lens driving device, a complicated driving mechanism, which is required when driving a plurality of lens group by a driving mechanism, is unnecessary. Thus, a simple structure can be obtained.

In one embodiment of the photographing lens driving control device according to the present invention, when the position of the another lens group with respect to the lens group positioned in the object side approaches the lens group positioned in the object side beyond a first predetermined position, the control device adjusts the driving speed of the another lens group such that the another lens group does not further approach the lens group positioned in the object side, wherein when the position of the another lens group stays away from the lens group positioned in the object side beyond a second predetermined position, which is positioned away from the lens group positioned in the object side beyond the first predetermined position, the control device adjusts the driving speed of the another lens group such that the another lens group does not further stay away from the lens group positioned in the object side.

According to the above embodiment of the photographing lens driving control device according to the present invention, since the lens group positioned in the object side and another lens group are driven while maintaining a predetermined interval, the interference and excessive disjunction between the lens group positioned in the object side and another lens group are avoided.

In one embodiment of the photographing lens driving control device according to the present invention, the control device increases the driving speed of the another lens group when the driving speed of the lens group positioned in the object side is increased, and the control device decreases the driving speed of the another lens group when the driving speed of the lens group positioned in the object side is decreased.

According to the above embodiment of the photographing lens driving control device according to the present invention, since the driving speed of another lens group is increased/decreased in accordance with the increase/decrease of the driving speed of the lens group positioned in the object side, the lens group positioned in the object side and another lens group does not interfere.

In one embodiment of the photographing lens driving control device according to the present invention, the control device increases the driving amount of the another lens group when the moving distance of the lens group positioned in the object side is increased, and the control device decreases the driving amount of the another lens group when the moving distance of the lens group positioned in the object side is decreased.

According to the above embodiment of the photographing lens driving control device according to the present invention, since the driving amount of another lens group is increased/decreased in accordance with the increase/decrease of the moving distance of the lens group positioned in the object side, the lens group positioned in the object side and another lens group does not interfere.

In one embodiment of the photographing lens driving control device according to the present invention, the lens driving device of the lens group positioned in the object side is a direct current motor, the lens driving device of the another lens group is a pulse motor.

According to the above embodiment of the photographing lens driving control device according to the present invention, the lens group positioned in the object side is smoothly driven, and another lens group is more accurately driven in accordance with the moving of the lens group positioned in the object side.

It is to be understood that both the foregoing general description and the following detailed description are exemplary, and are intended to provide further explanation of the invention as claimed.

BRIEF DESCRIPTION OF THE DRAWINGS

FIG. 2 is a table showing positional information of the lens groups in the first embodiment of the present invention.

FIG. 12 is a timing chart of the fourth embodiment of the present invention.

FIG. 16 is another timing chart of the fourth embodiment of the present invention.

DETAILED DESCRIPTION OF THE PREFERRED EMBODIMENTS

Hereinafter, embodiments of the present invention will be explained with reference to the drawings.

First Embodiment

Figure 1:
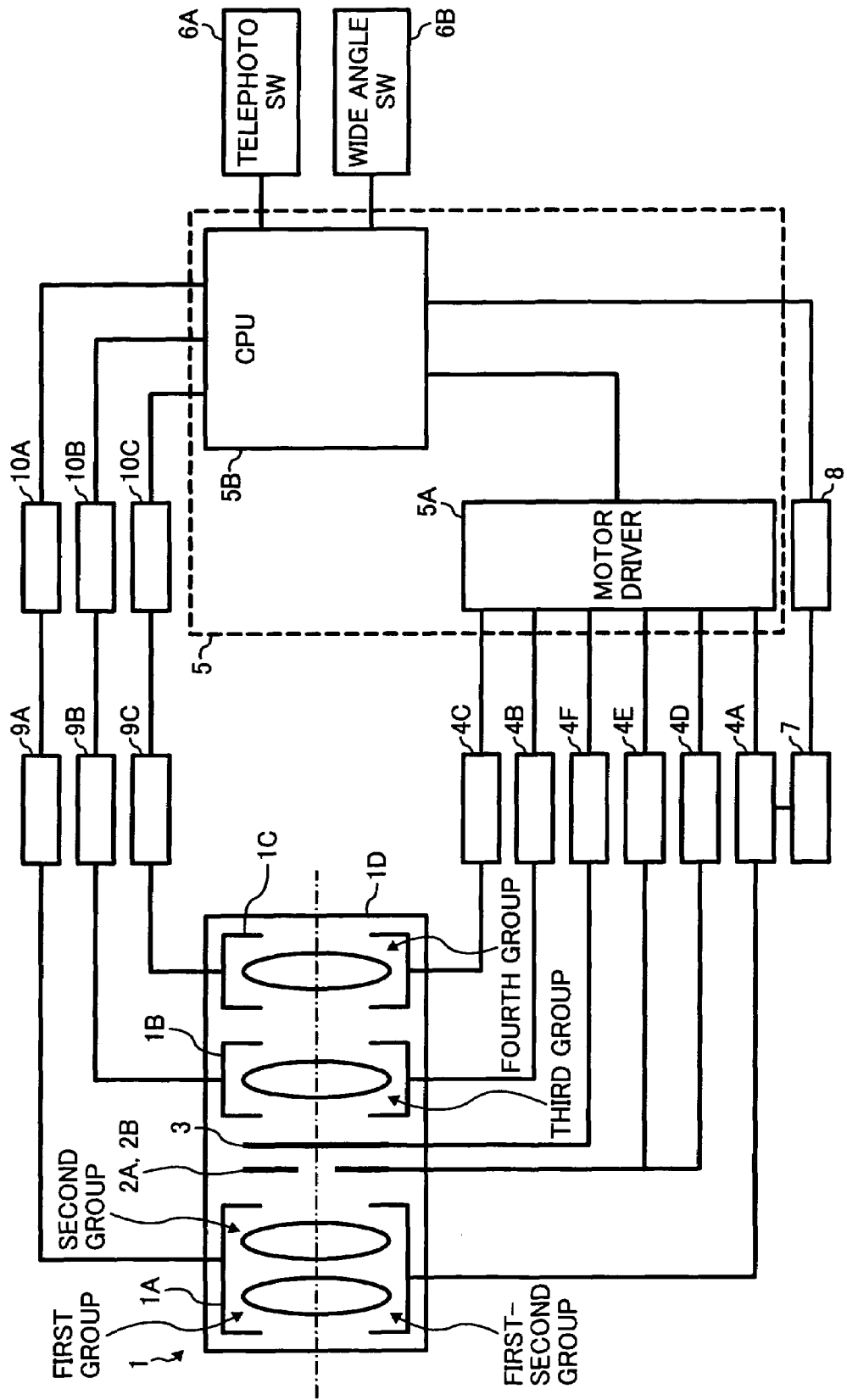
FIG. 1 is a block diagram of a first embodiment of the present invention.

FIG. 1 is a block diagram of the embodiments of the present invention.

A photographing lens 1 comprises a first-second group 1A, a third group 1B and a fourth group 1C. Each of the groups is a lens group having a plurality of lenses. These lens groups 1A-1C are arranged in a lens barrel 1D such that each of the central axes is on the same optical axis. In this case, a first aperture stop 2A, a second aperture stop 2B, which control light volume entering to the photographing lens 1 from a photographed object, and a shutter 3 which, controls an exposure time of photographing, are disposed between the first-second group 1A and the third group 1B.

The first-second group 1A and the third group 1B are lens groups for changing a photographing magnification. The fourth group 1C is a lens group for focusing an image onto an exposure plane (not shown) positioned back of the fourth group 1C.

Each of the groups, 1A, 1B, 1C is driven by a motor, and is moved parallel to the optical axis to achieve a target optical system.

In addition, a first group and a second group comprising the first-second group 1A are disposed in a cam cylinder (not shown) in which the interval between the first group and the second group is mechanically adjusted by a cam mechanism. When a first-second group motor 4A drives the first-second group 1A, the first-second group motor 4B mechanically drives the first-second group 1A such that the interval between the first group and the second group becomes a predetermined interval.

In this case, the first-second group motor 4A is a direct current motor. A third group motor 4B and a fourth group motor 4C are pulse motors, respectively, (a driving mechanism is not shown). Generally, a direct current motor can increase a rotational speed compared with rotational speed of a pulse motor provided that supply capability is the same. In addition, by a feature that the driving power is changed in accordance with a change in a load, if the load increases, the driving power increases, resulting in increased driving torque. Accordingly, the direct current motor is characterized as being strong in a load change. With this characteristic, the direct current motor is suitable for driving a cam cylinder that the load of the motor is changed by the change in the inclination of the cam with a zoom position. At the same time, the direct current motor causes a gap from a stop control to an actual stop, namely, overruns by inertia of the direct current motor. Accordingly, it is difficult for the direct current motor to stop at a desired position.

On the other hand, a pulse motor is driven by an externally input pulse. It is easy for the pulse motor to stop at a given position, but it is not strong for torque fluctuations. Therefore, it is suitable for control when the torque fluctuations are less.

With the above characteristics of each motor, a direct current motor is used for the first-second group motor 4A, and a pulse motor is used for the third group motor 4B and the fourth group motor 4C.

The first aperture stop 2A, the second aperture stop 2B and the shutter 3 are driven by a first aperture stop motor 4D, a second aperture stop motor 4E, and a shutter motor 4F, respectively (driving mechanisms are not shown).

Each of the motors, 4A-4F is electrically connected to a motor driver 5A.

The motor driver 5A obtains information required for driving and controlling each of the motors, 4A-4F, for example, driving timing, a driving amount, a driving direction and the like, from a CPU 5B, which is electrically connected to the motor driver 5A, so as to drive and control each of the motors 4A-4F.

The motor 4A is provided with a first-second group moving amount detecting device 7, which generates a pulse depending on the number of rotations in accordance with the rotation. The first-second group moving amount detecting device 7 is driven by a first-second group moving amount detecting device driving circuit 8, which is electrically connected thereto. In addition, the pulse output by the first-second group moving amount detecting device 7 is loaded into the CPU 5B.

The first-second group moving amount detecting device 7 outputs a predetermined number of pulses, for example, 1280 pulses, between when the photographing lens 1 becomes the most telephoto state and when the photographing lens 1 becomes the most wide angle state. This interval is divided into a predetermined number, for example, 16 (80 pulses each), and seventeen positional indicators, namely, zoom positions, Zp1, Zp2 . . . , Zp17 are set. FIG. 2 shows the relationship between the output pluses and the zoom positions of the first-second moving amount detecting device 7. In addition, FIG. 2 shows the positional relationship among the reference position, which starts counting a pulse, and the zoom positions and the photographing lens storage position. The number of pulses shown in FIG. 2 is obtained by counting from the reference position in FIG. 2 as 0, and the photographing lens storage position side from the reference position is counted by a negative value.

On the contrary, the third group motor 4B and the fourth group motor 4C, which drive the third group 1B and the fourth group 1C, are pulse motors, respectively. The third group motor 4B and the fourth group motor 4C are driven depending on the number of pulses to be applied from the motor driver 5 in accordance with an instruction from the CPU 5B.

In this case, the number of pulses to be input to the third group motor 4B required for disposing the third group 1B in each of the zoom positions Zp1-Zp17 is set as shown in FIG. 2. In addition, the fourth group 1C is a focusing lens group; thus, the positional explanation thereof is omitted.

The first-second group 1A, the third group 1B and the fourth group 1C are provided with a first-second group reference position detecting device 9A, a third group reference position detecting device 9B and a fourth group reference position detecting device 9C, which detect a reference position, respectively. Each of the reference position detecting devices 9A-9C detects whether each of the lens groups is in the reference position or not. The first-second group reference position detecting device 9A, the third group reference position detecting device 9B and the fourth group reference position detecting device 9C are driven by a first-second group reference position detecting device control circuit 10A, a third group reference position detecting device control circuit 10B, and a fourth group reference position detecting device control circuit 10C, respectively. The positions are loaded into the CPU 5B.

The CPU 5B is electrically connected with a telephoto switch 6A (FIG. 1, telephoto SW), which is operated for increasing a magnification of the photographing lens 1 when telephoto photographing is conducted, and a wide angle switch 6B (FIG. 1, wide angel SW) which is operated for reducing a magnification of the photographing lens 1 when wide angle photographing is conducted. The CPU 5B controls each of the motors 4A, 4B, 4C depending on the operation of the telephoto switch 6A and the wide angle switch 6B.

A control device 5 comprises the motor driver 5A and the CPU 5B.

Next, a fundamental operation of the first embodiment of the present invention will be explained with reference to the flowchart in FIG. 3, the timing charts in FIGS. 4-7 and the operation explanatory view in FIG. 8.

The present embodiment shows a driving control method, which changes the driving speed of the third group 1B depending on the position of the third group 1B with respect to the position of the first-second group 1A, and simultaneously drives the first-second group 1A and the third group 1B, so as to avoid the interference between the first-second group 1A and the third group 1B.

In the driving control method, the control flow is different if a driving direction of the photographing lens 1 is a condition to be driven from the telephoto to the wide angle, or if a driving direction of the photographing lens 1 is a condition to be driven from the wide angle to the telephoto. Therefore, hereinafter, the driving control method will be explained if the driving direction of the photographing lens 1 is driven from the telephoto to the wide angle, and if the driving direction of the photographing lens 1 is driven from the wide angle to the telephoto.

First, the driving control method when the driving direction of the photographing lens 1 is driven from the wide angle to the telephoto will be explained.

At Step S101, it is judged whether the driving direction of the photographic lens 1 is the condition to be driven from the telephoto to the wide angle or the condition to be driven from the wide angel to the telephoto, in order to determine the need for the after-mentioned driving control for retracting the fourth group 1C (fourth group 1C retracting driving control).

If a user presses the telephoto switch 6A, which drives the photographing lens 1 from the wide angle to the telephoto, such that the photographing lens 1 becomes the condition to be driven from the wide angle to the telephoto (FIG. 3, W→T), each of the lens groups is driven in a direction that an interval between each of the lens groups is increased. Accordingly, the fourth group 1C retracting driving control is unnecessary, and the flow goes to Step S103.

At Step S103, in order to determine the need for the aftermentioned driving control for retracting the third group 1B (third group 1B retracting driving control), it is judged whether the driving direction of the photographing lens 1 is the condition to be driven from the telephoto to the wide angle, or the driving direction of the photographing lens 1 is the condition to be driven from the wide angle to the telephoto.

If a user presses the telephoto switch 6A, which drives the photographing lens 1 from the wide angle to the telephoto, such that the photographing lens 1 becomes the condition to be driven from the wide angle to the telephoto (FIG. 3, W→T), each of the lens groups is driven in a direction that the interval between each of the lens groups is increased. Accordingly, the third group 1B retracting driving control is unnecessary, and the flow goes to Step S10.

At Step S105, the driving of the first-second group 1A is started by the pressed telephoto switch 6A with the first-second group motor 4A.

In this case, since the first-second group motor 4A is a direct current motor, incoming current generates right after the beginning of the driving, resulting in an unstable control. To avoid this, the driving voltage of the first-second group motor 4A right after the beginning of the driving of the first-second group 1A is set lower than driving voltage of a steady operation, and an activation control, which boosts the voltage to voltage of a steady operation, is conducted after a predetermined time (reference to the timing charts of the telephoto switch 6A and the first-second group motor 4A in FIGS. 4, 5).

Moreover, the driving voltage between the telephoto and the wide angle is set lower than the driving voltage between the wide angle and the photographing lens storage position. This is because the voltage between the wide angle and the photographing lens storage position is set high for the requirement of high speed driving. On the contrary, the voltage between the telephoto and the wide angle is appropriately set such that the driving is quickly stopped at a target position by the operation of the telephoto switch 6A or the wide angle switch 6B.

After the driving of the first-second group 1A is started at Step S105, the flow moves to Step S106.

At Step S106, it is determined whether the first-second group 1A should be stopped or not. Here, if the first-second group 1A should be stopped, more particularly, if the telephoto switch 6A is not pressed (as the telephoto switch 6A becomes OFF in FIG. 5), or if the first-second group 1A is driven to within a predetermined distance with respect to the position of the most telephoto side (as the stop control of the first-second motor 4A is started in FIG. 4), the flow moves to Step S112.

On the contrary, if the first-second group 1A should not be stopped, the flow moves to Step S107.

At Step S107, it is judged whether the third group 1B is stopped, or is driven. Here, if the third group 1B is stopped, the flow moves to Step S108. On the contrary, if the third group 1B is driven, the flow moves to Step S110.

At Step S108, it is determined whether a predetermined time has been passed or not after the driving of the first-second group 1A is started, so as to allow a time difference between timing for starting the driving of the first-second group 1A and timing for starting the driving of the third group 1B. By the time difference between the timing for starting the driving of the first-second group 1A and the timing for starting the driving of the third group 1B, the driving current of the third group motor 4B does not overlap with the timing of the incoming current, which is generated when the driving of the first-second group motor 4A is started. Accordingly, the power supply is not required to supply large power consumption in a short time. Therefore, the battery life can be improved. The passage of a predetermined time is determined by counting the number of predetermined output pulses from the first-second group moving amount detecting device 7.

At Step 108, if a predetermined time has been passed after the driving of the first-second group 1A is started, the flow moves to Step S109. On the contrary, if a predetermined time has not been passed after the driving of the first-second group 1A is started, the flow goes back to Step S106 to repeat the above flow.

At Step S109, the driving of third group 1B is started by the third group motor 4B. Here, the driving speed of the third group 1B is adopted such that a predetermined speed, for example, the input pulse rate of the third group motor 4B becomes 600 pps (pulses per second). Then the flow goes back to Step S106.

If the third group 1B is driven at Step S107, the flow moves to Step S110. At Step S110, the position of the third group 1B with respect to the first-second group 1A is examined, and it is determined whether the driving speed of the third group 1B should be changed or not, so as to avoid the interference and excessive disjunction between the first-second group 1A and the third group 1B.

Figure 8:
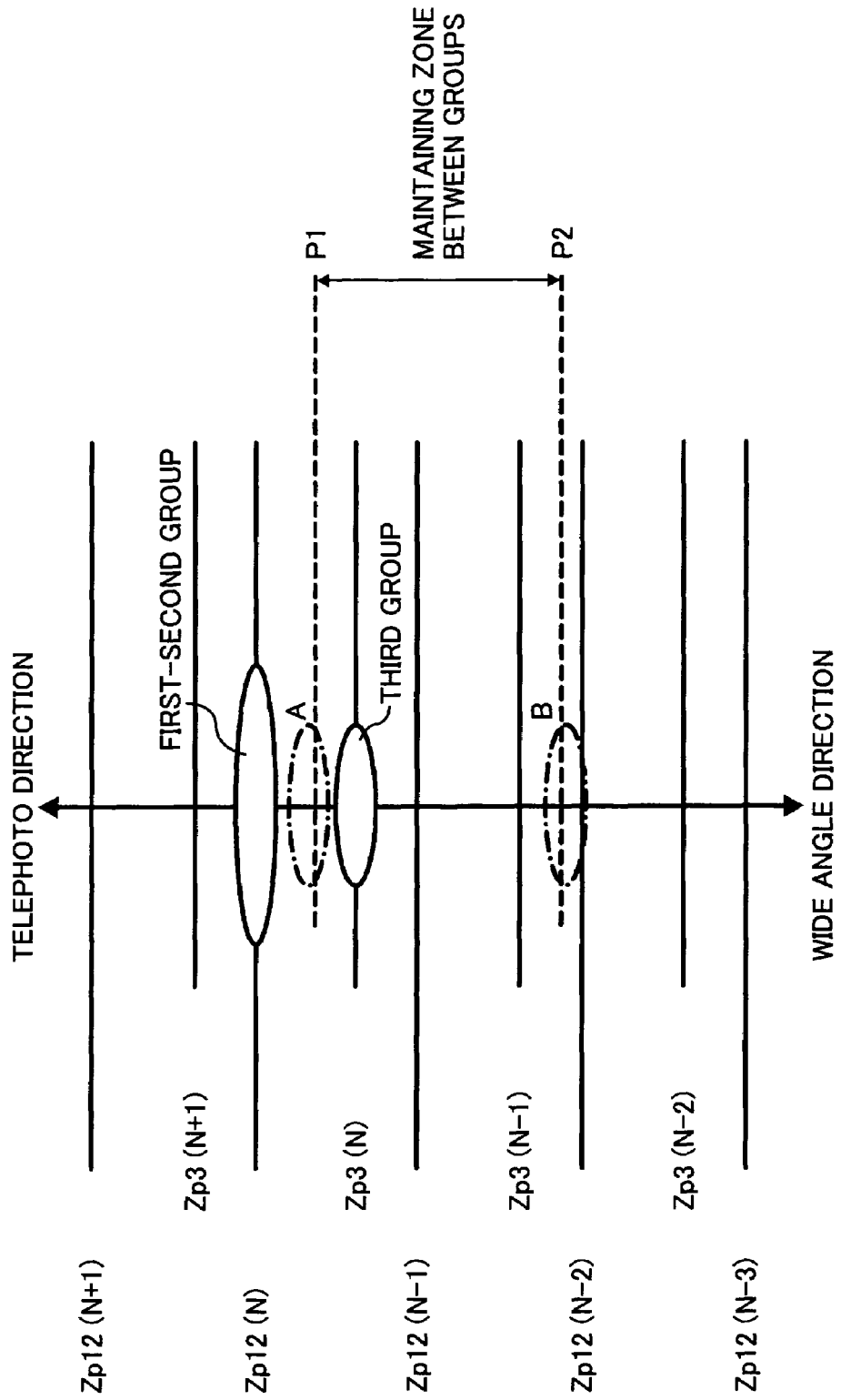
FIG. 8 is an explanation view showing the operations of the first embodiment of the present invention.

Here, as shown in FIG. 8, if the position of the third group 1B is a condition, which approaches the first-second group 1A beyond a predetermined position P1 (FIG. 8, dotted line portion A), or if the position of the third group 1B is a condition, which stays away from the first-second group 1A beyond a predetermined position P2 (FIG. 8, dotted line portion B), the driving speed of the third group 1B should be changed, so the flow moves to Step S111. On the contrary, if the position of third group 1B with respect to the first-second group 1A is between P1 and P2, the change in the driving speed of the third group 1B is unnecessary, so the flow goes back to Step S106. Hereinafter, an interval between P1 and P2 is refereed to as a maintaining zone between groups.

At Step S111, if the position of the third group 1B with respect to the position of the first-second group 1A is the condition, which approaches the first-second group 1A beyond the predetermined position P1 (FIG. 8, dotted line portion A), the first-second group 1A and the third group 1B may interfere. Therefore, the speed of the third group 1B is reduced at a predetermined amount to avoid the interference between the first-second group 1A and the third group 1B.

Moreover, if the position of the third group 1B with respect to the position of the first-second group 1A is the condition, which stays away from the first-second group 1A beyond the predetermined position P2 (FIG. 8, dotted line B), the interval between the first-second group 1A and the third group 1B may be excessively increased. Therefore, the speed of the third group 1B is increased at a predetermined amount, so as to avoid the excessive disjunction between the first-second group 1A and the third group 1B.

An appropriate value for the amount of acceleration/deceleration is calculated by the CPU 5 based on the driving speed of the first-second group 1A, the position of the first-second group 1A to be detected by the first-second group moving amount detecting device 7, and the position of the third group 1B to be calculated by the input pulse of the third group motor 4B.

Here, one example for a specific interval value will be explained with reference to FIG. 2.

The driving speed of the third group 1B, i.e., the input pulse rate of the third group motor 4B is adopted to be, generally, 600 pps. When accelerating and decelerating, the input pulse rate is increased and decreased by 100 pps. Moreover, the maximum speed is 1000 pps, and the minimum speed is 0 pps, i.e., stopped condition.

FIG. 8 is a schematic illustration showing positional relationship between the first-second group 1A and the third group 1B. The zoom position Zp3 (N) of the third group 1B, which establishes a predetermined magnification with respect to the zoom position Zp12 (N) of the first-second group 1A, is previously set (reference to FIG. 2).

In this case, the position P1 of the third group 1B, which starts the deceleration of the third group 1B, is a position, which approaches the next zoom position Zp3 (N+1) of the third group 3B from the zoom position Zp3 (N) of the third group 1B by 1/3 between the zoom position Zp3 (N) of the third group 1B and the next zoom position Zp3 (N+1) of the third group 1B. That is, P1=Zp3 (N)+(Zp3(N+1)−Zp3(N))/3.

In addition, the position P2 of the third group 1B, which starts the acceleration of the third group 1B, is a position, which approaches two behind zoom position Zp3 (N−2) of the third group 1B from one behind zoom position Zp3 (N−1) of the third group 1B by ⅓ between the one behind zoom position Zp3 (N−1) of the third group 1B and the two behind zoom position Zp3 (N−2) of the third group 1B. That is, P2=Zp3(N−1)+(Zp3(N−1)−Zp3(N−2))/3.

If P1 and P2 are expressed by output pulses to the third group motor 4B shown in FIG. 2, when the zoom position of the third group 1B is Zp3(4)(N=4), $P1=360+(360-360)/3=366$ $P2=340-(340-320)/3=334.$ More particularly, with a condition that the zoom position of the third group 1B is Zp3 (4) (N=4), if the output pulse to the third group motor 4B becomes 366 or more, the driving speed of the third group 1B is decreased, and if the output pulse to the third group motor 4B becomes 334 or less, the driving speed of the third group 1B is increased.

As stated above, the first-second group 1A and the third group 1B can be simultaneously driven while avoiding the interference and the excessive disjunction between the first-second group 1A and the third group 1B by controlling the speed of the third group 1B if the position of the third group 1B deviates from the maintaining zone between groups.

After it is determined that the first-second group 1A should be stopped at Step S106, the flow moves to Step S112.

At Step S112, the driving condition of the third group 1B is judged. Here, if the third group 1B is stopped, the flow moves to Step S114. On the contrary, if the third group 1B is driven, the flow moves to Step S113, and after the driving of the third group 1B is stopped, the flow moves to Step S114.

At Step S114, the stop control of the first-second group 1A is carried out. The first-second group 1A is driven by the first-second group motor 4A of a direct current motor, so the rotation of the first-second group motor 4A is not sharply stopped when the applied driving voltage is stopped, resulting in the overrun of the first-second group motor 4A. In order to reduce the amount of the overrun, once the stop control of the first-second group 1A is started, a stop control, which lowers the driving voltage of the first-second group motor 4A, is conducted (reference to the timing charts of the first-second group motor 4A in FIGS. 4, 5). After this, the flow moves to Step S115.

Figure 4:
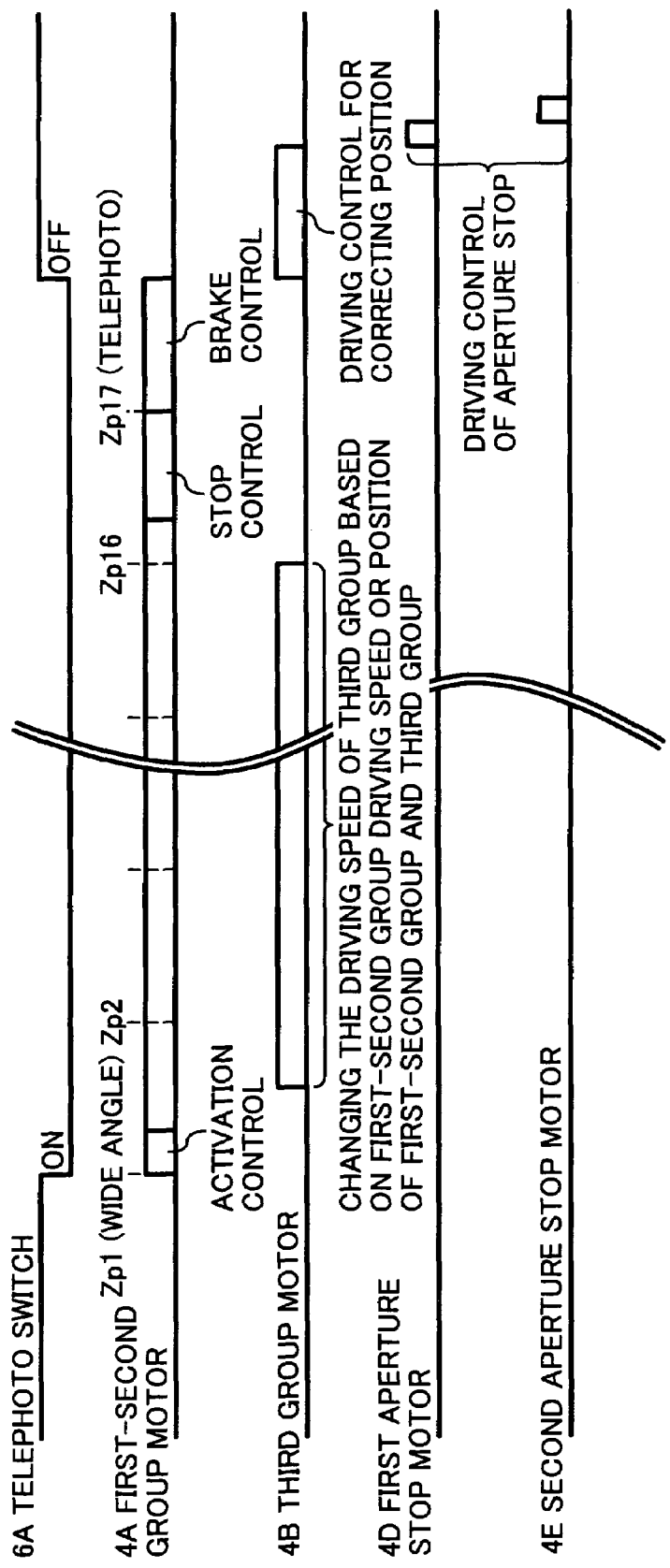
FIG. 4 is a timing chart of the first embodiment of the present invention.
Figure 5:
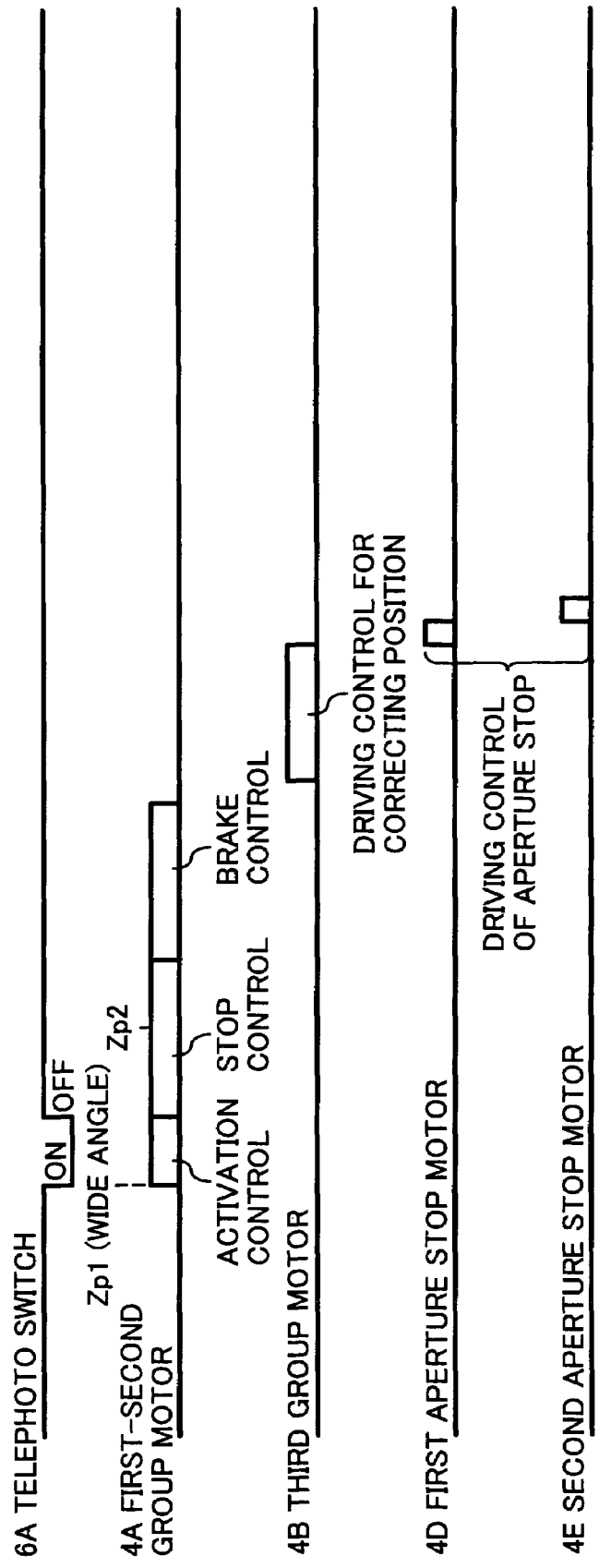
FIG. 5 is another timing chart of the first embodiment of the present invention.

At Step S115, once the number of pulses output by the first-second group moving amount detecting device 7 achieves a predetermined number from the point that the stop control of the first-second group 1A is started, a brake control (general electromagnetic brake, etc.) of the first-second group motor 4A is conducted for stopping the first-second group 1A; thereby, the first-second group 1A is stopped (reference to the timing charts of the first-second group motor 4A in FIGS. 4, 5). In addition, the stop position of the first-second group 1A includes the overrun during the brake control. After this, the flow moves to Step S116.

At Step S116, a driving direction of the photographing lens 1 is judged, so as to carry out the after-mentioned backlash control, which prevents the displacement of the lens groups by allowance of gears (not shown) provided in a driving mechanism. If the driving direction of the photographing lens 1 is from the wide angle to the telephoto (FIG. 3, W→T), it is determined that the backlash control is unnecessary in the present embodiment, so the flow moves to Step S118. If the driving direction of the photographing lens 1 is from the telephoto to the wide angle (FIG. 3, T→W), it is determined that the backlash control is necessary in the present embodiment, so the flow moves to Step S117 to perform the backlash control.

At Step S118, a driving control for correcting the position of the third group 1B is carried out (reference to the timing charts of the third group motor 4B in FIGS. 4, 5). In this driving control, an appropriate stop position of the third group 1B corresponding to the final position of the first-second group 1A is calculated by using the CPU 5, and the third group 1B is driven to the appropriate position. The calculation of this position is performed based on positional information of the first-second group 1A and the third group 1B shown in FIG. 2. After this, the flow moves to Step S119.

At Step S119, a driving control of an aperture stop is conducted for setting the first aperture stop 2A and the second aperture stop 2B to an aperture stop value corresponding to the position of the stopped lens groups (reference to the timing charts of the first aperture stop 2A and the second aperture stop 2B in FIGS. 4, 5). After this, the flow moves to Step S120, and the driving control of the photographing lens 1 is completed.

Next, it will be explained when a driving direction of the photographing lens 1 is driven from the telephoto to the wide angle.

Figure 7:
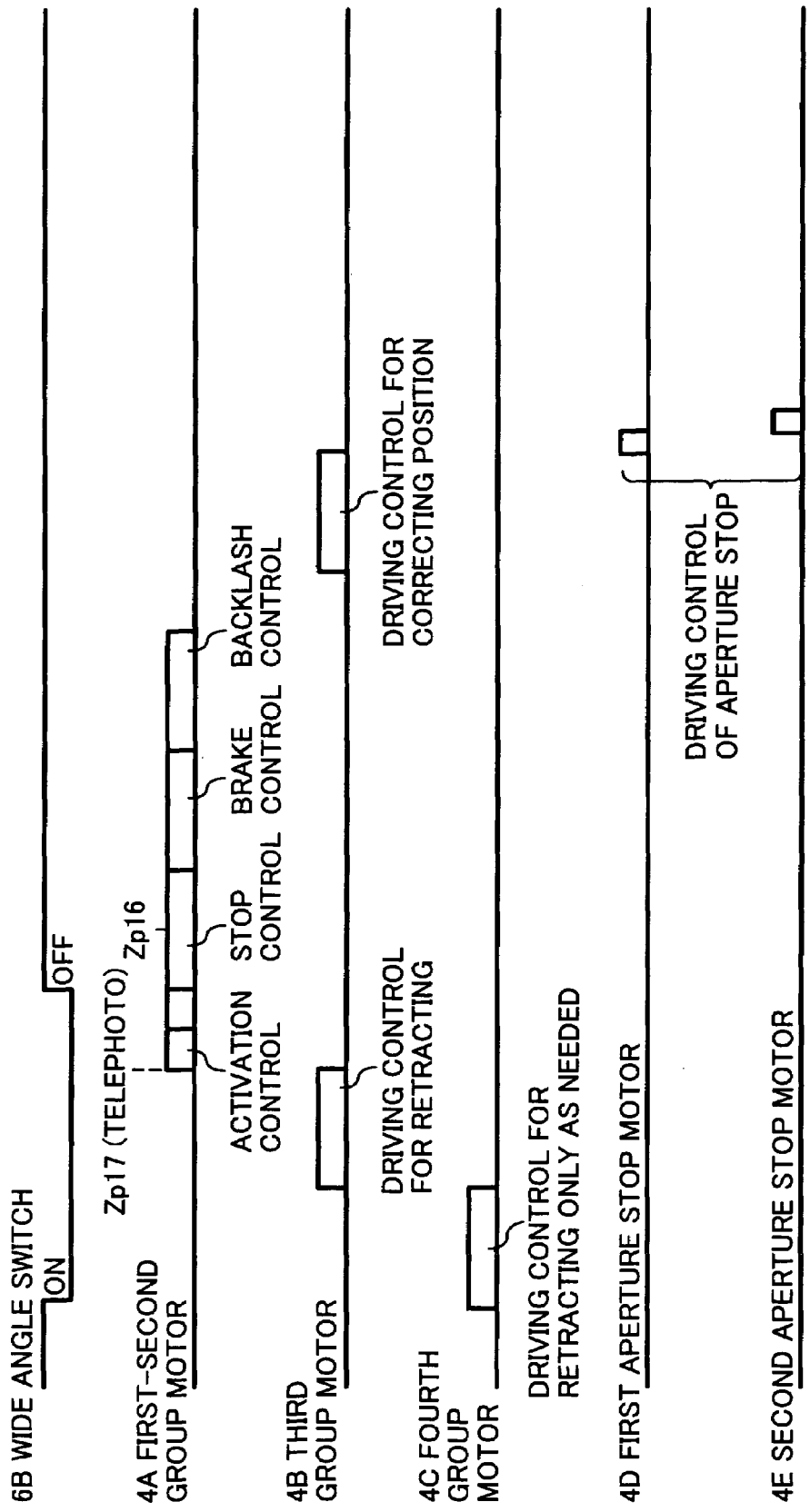
FIG. 7 is another timing chart of the first embodiment of the present invention.

If a user presses the wide angle switch 6B, which drives the photographing lens 1 from the telephoto to the wide angle, such that the photographing lens 1 becomes a condition to be driven from the telephoto to the wide angle (FIG. 3, T→W), the flow goes to Step S102 from Step At Step S102, the driving control for retracting the fourth group 1C, which keeps the fourth group 1C away from the third group 1B, is performed (reference to the timing charts of the fourth group motor 4C in FIGS. 7, 8). If the photographing lens 1 is driven from the telephoto to the wide angle, the photographing lens 1 becomes a condition that the interval between each of the lens groups is reduced; thereby, the third group 1B and the fourth group 1C may interfere in some cases. Therefore, if the fourth group 1C is positioned closer to the third group 1B than a predetermined position, which does not interfere with the third group 1C, the driving control for retracting the fourth group 1C is conducted for keeping the fourth group 1C away from the third group 1B to a predetermined position, which does not interfere with the third group 1B when the third group 1B is driven. After that, the flow moves to Step S103.

At Step S103, it is judged whether the driving direction of the photographing lens 1 is the condition to be driven from the telephoto to the wide angle, or is the condition to be driven from the wide angle to the telephoto, in order to determine the need of the driving control for retracting the third group 1B.

If a user presses the wide angle switch 6B, which drives the photographing lens 1 from the telephoto to the wide angle, such that the photographing lens 1 becomes the condition to be driven from the telephoto to the wide angle (FIG. 3, T→W), the flow goes to Step S104.

Figure 6:
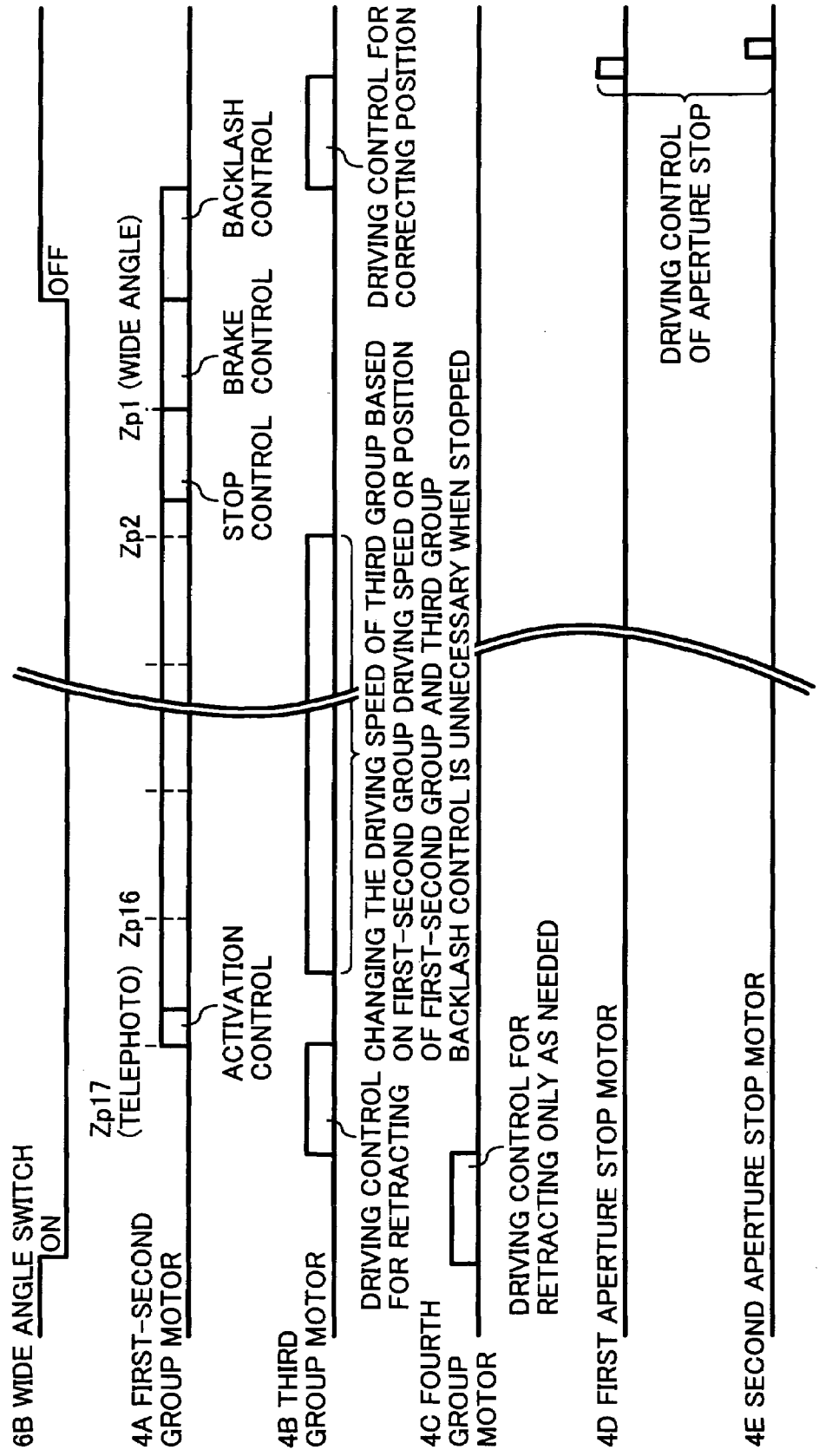
FIG. 6 is another timing chart of the first embodiment of the present invention.

At Step S104, the driving control for retracting the third group 1B, which keeps the third group 1B away from the first-second group 1A, is conducted (reference to the timing charts of the third group motor 4B in FIGS. 6, 7). If the photographing lens 1 is driven from the telephoto to the wide angle, the photographing lens 1 becomes the condition that the interval between each of the lens groups is reduced; thereby the third group 1B and the first-second group 1A may interfere in some cases. Therefore, before driving the first-second group 1A, the driving control for retracting the third group 1B is conducted, which keeps the third group 1B away from the first-second group 1A by a predetermined distance, for example, half of the distance between the zoom position Zp3 (N) and one behind zoom position Zp3(N−1) that the third group 1B positions. After this, the flow goes to Step S105.

At Step S105, the driving of the first-second group 1A is started by the pressed wide angle switch 6B with the first-second group motor 4A. In this case, since the first-second group motor 4A is a direct current motor, incoming current generates right after the beginning of the driving, resulting in an unstable control. To avoid this, the driving voltage of the first-second group motor 4A right after the beginning of the driving of the first-second group 1A is set lower than driving voltage of a steady operation, and an activation control, which boosts the voltage to voltage of a steady operation, is conducted after a predetermined time (reference to the timing charts of the first-second group motor 4A in FIGS. 6, 7).

After the driving of the first-second group 1A is started at Step S105, the flow moves to Step S106.

At Step S106, it is determined whether the first-second group 1A should be stopped or not. Here, if the first-second group 1A should be stopped, more particularly, if the wide angle switch 6B is not pressed (as the wide angle switch 6B becomes OFF in FIG. 7), or if the first-second group 1A is driven to within a predetermined distance with respect to the position of the most wide angle side (as the stop control of the first-second motor 4A is started in FIG. 6), the flow moves to Step S112.

On the contrary, if the first-second group 1A should not be stopped, the flow moves to Step S107.

At Step S107, it is judged whether the third group 1B is stopped, or is driven. Here, if the third group 1B is stopped, the flow moves to Step S108. On the contrary, if the third group 1B is driven, the flow moves to Step S110.

At Step S108, it is determined whether a predetermined time has been passed or not after the driving of the first-second group 1A is started, so as to allow a time difference between the timing for starting the driving of the first-second group 1A and the timing for starting the driving of the third group 1B. By the time difference between the timing for starting the driving of the first-second group 1A and the timing for starting the driving of the third group 1B, the first-second group motor 4A and the third group motor 4B should not be simultaneously driven. Accordingly, the power supply is not required to supply large power consumption in a short time. Therefore, the battery life can be improved. The passage of a predetermined time is determined by counting the number of predetermined output pulses from the first-second group moving amount detecting device 7.

At Step S108, if a predetermined time has been passed after the driving of the first-second group 1A is started, the flow moves to Step S109. On the contrary, if a predetermined time has not been passed after the driving of the first-second group 1A is started, the flow goes back to Step S106 to repeat the above flow.

At Step S109, the driving of third group 1B is started by the third group motor 4B. Here, the driving speed of the third group 1B is adopted such that a predetermined speed, for example, the input pulse rate of the third group motor 4B becomes 600 pps (pulses per second). Then the flow goes back to Step S106.

If the third group 1B is driven at Step S107, the flow moves to Step S110. At Step S110, the position of the third group 1B with respect to the first-second group 1A is examined, and it is determined whether the driving speed of the third group 1B should be changed or not, so as to avoid the interference and excessive disjunction between the first-second group 1A and the third group 1B.

Here, as shown in FIG. 8, if the position of the third group 1B is a condition, which approaches the first-second group 1A beyond a predetermined position P1 (FIG. 8, dotted line portion A), or if the position of the third group 1B is a condition, which stays away from the first-second group 1A beyond a predetermined position P2 (FIG. 8, dotted line portion B), the flow moves to Step S111. On the contrary, if the position of third group 1B with respect to the first-second group 1A is between P1 and P2, i.e., the maintaining zone between groups, the flow goes back to Step S106.

At Step S111, if the position of the third group 1B with respect to the position of the first-second group 1A is the condition, which approaches the first-second group 1A beyond the predetermined position P1 (FIG. 8, dotted line portion A), the first-second group 1A and the third group 1B may interfere. Therefore, the speed of the third group 1B is increased at a predetermined amount, so as to avoid the interference between the first-second group 1A and the third group 1B.

Moreover, if the position of the third group 1B with respect to the position of the first-second group 1A is the condition, which stays away from the first-second group 1A beyond the predetermined position P2 (FIG. 8, dotted line B), the interval between the first-second group 1A and the third group 1B may be excessively increased. Therefore, the speed of the third group 1B is reduced at a predetermined amount, so as to avoid the excessive disjunction between the first-second group 1A and the third group 1B.

An appropriate value for the amount of acceleration/deceleration is calculated by the CPU 5 based on the driving speed of the first-second group 1A, the position of the first-second group 1A to be detected by the first-second group moving amount detecting device 7, and the position of the third group 1B to be calculated by the input pulse of the third group motor 4B.

Here, one example for a specific interval value will be explained with reference to FIG. 2.

The driving speed of the third group 1B, i.e., the input pulse rate of the third group motor 4B is adopted to be, generally, 600 pps. When accelerating and decelerating, the input pulse rate is increased and decreased by 100 pps. Moreover, the maximum speed is 1000 pps, and the minimum speed is 0 pps, i.e., stopped condition.

FIG. 8 is a schematic illustration showing positional relationship between the first-second group 1A and the third group 1B. The zoom position Zp3 (N) of the third group 1B, which establishes a predetermined magnification with respect to the zoom position Zp12 (N) of the first-second group 1A, is previously set (reference to FIG. 2).

In this case, the position P1 of the third group 1B, which starts the deceleration of the third group 1B, is a position, which approaches the next zoom position Zp3 (N+1) of the third group 3B from the zoom position Zp3 (N) of the third group 1B by ⅓ between the zoom position Zp3 (N) of the third group 1B and the next zoom position Zp3 (N+1) of the third group 1B. That is, P1=Zp3(N)+(Zp3 (N+1)−Zp3(N))/3.

In addition, the position P2 of the third group 1B, which starts the acceleration of the third group 1B, is a position, which approaches two behind zoom position Zp3 (N−2) of the third group 1B from one behind zoom position Zp3 (N−1) of the third group 1B by ⅓ between the one behind zoom position Zp3 (N−1) of the third group 1B and the two behind zoom position Zp3 (N−2) of the third group 1B. That is, P2=Zp3(N−1)+(Zp3(N−1)−Zp3(N−2))/3.

If P1 and P2 are expressed by output pulses to the third group motor 4B shown in FIG. 2, when the zoom position of the third group 1B is Zp3 (4) (N=4), $$P1=360+(360-360)/3=366$$

$$P2=340-(340-320)/3=334.$$

More particularly, with a condition that the zoom position of the third group 1B is Zp3 (4) (N=4), if the output pulse to the third group motor 4B becomes 366 or more, the driving speed of the third group 1B is increased, and if the output pulse to the third group motor 4B becomes 334 or less, the driving speed of the third group 1B is decreased.

As stated above, the first-second group 1A and the third group 1B can be simultaneously driven while avoiding the interference and the excessive disjunction between the first-second group 1A and the third group 1B by controlling the speed of the third group 1B if the position of the third group 1B deviates from the maintaining zone between groups.

After it is determined that the first-second group 1A should be stopped at Step S106, the flow moves to Step S112.

At Step S112, the driving condition of the third group 1B is judged. Here, if the third group 1B is stopped, the flow moves to Step S114. On the contrary, if the third group 1B is driven, the flow moves to Step S113, and after the driving of the third group 1B is stopped, the flow moves to Step S114.

At Step S114, the stop control of the first-second group 1A is carried out. The first-second group 1A is driven by the first-second group motor 4A of a direct current motor, so the rotation of the first-second group motor 4A is not sharply stopped when the applied driving voltage is stopped, resulting in the overrun of the first-second group motor 4A. In order to reduce the amount of the overrun, once the stop control of the first-second group 1A is started, a stop control, which lowers the driving voltage of the first-second group motor 4A, is conducted (reference to the timing charts of the first-second group motor 4A in FIGS. 4, 5). After the stop control, the flow moves to Step S115.

At Step S115, once the number of pulses output by the first-second group moving amount detecting device 7 achieves a predetermined number from the point that the stop control of the first-second group 1A is started, a brake control (general electromagnetic brake, etc.) of the first-second group motor 4A is conducted for stopping the first-second group 1A; thereby, the first-second group 1A is stopped (reference to the timing charts of the first-second group motor 4A in FIGS. 6, 7). In addition, the stop position of the first-second group 1A includes the overrun during the brake control. After this, the flow moves to Step S116.

At Step S116, a driving direction of the photographing lens 1 is judged, so as to carry out the after-mentioned backlash control, which prevents the displacement of the lens groups by allowance of gears (not shown) provided in a driving mechanism. If the driving direction of the photographing lens 1 is from the telephoto to the wide angle (FIG. 3, T→W), the flow moves to Step S117 to perform the backlash control in the present embodiment.

At Step S117, the backlash control of the first-second group 1A is performed (reference to the timing charts of the first-second group motor 4A in FIGS. 6, 7). The backlash control is performed such that after driving the first-second group 1A beyond a predetermined stop position, the first-second group 1A is driven again in the opposite direction, i.e., in the telephoto direction from the wide angle to set back the first-second group 1A to a predetermined position. A gear provided in a normal driving mechanism has allowance; thus, a precise position is not settled without change. Accordingly, the influence of the allowance is avoided by performing the driving that a driving direction of the driving portion becomes always one direction. After the backlash control is performed, the flow goes to Step S118.

At Step S118, a driving control for correcting the position of the third group 1B is carried out (reference to the timing charts of the third group motor 4B in FIGS. 6, 5). In this driving control, an appropriate stop position of the third group 1B corresponding to the final position of the first-second group 1A is calculated by using the CPU5, and the third group 1B is driven to the appropriate position. The calculation of this position is performed based on positional information of the first-second group 1A and the third group 1B shown in FIG. 2. After this, the flow moves to Step S119.

At Step S119, a driving control of an aperture stop is conducted for setting the first aperture stop 2A and the second aperture stop 2B to an aperture stop value corresponding to the position of the stopped lens groups (reference to the timing charts of the first aperture stop motor 4D and the second aperture stop motor 4E in FIGS. 6, 7). After this, the flow moves to Step S120, and the driving control of the photographing lens 1 is completed.

Moreover, the above mentioned maintaining zone between groups can be a different zone when driving the photographing lens 1 from the wide angle to the telephoto and when driving the photographing lens 1 from the telephoto to the wide angle. The maintaining zone between groups can be changed for each of the zoom positions.

In the present invention, the backlash control is performed when driving the photographing lens 1 from the telephoto to the wide angle, but can be performed when driving the photographing lens 1 from the wide angle to the telephoto.

Second Embodiment

Next, a fundamental operation of a second embodiment of the present invention will be explained with reference to the flowchart in FIG. 3 and the timing chart in FIG. 9.

The present embodiment shows a driving control method, which changes the driving speed of the third group 1B based on the driving speed of the first-second group 1A, and simultaneously drives the first-second group 1A and the third group 1B, so as to avoid the interference between the first-second group 1A and the third group 1B.

Figure 3A:
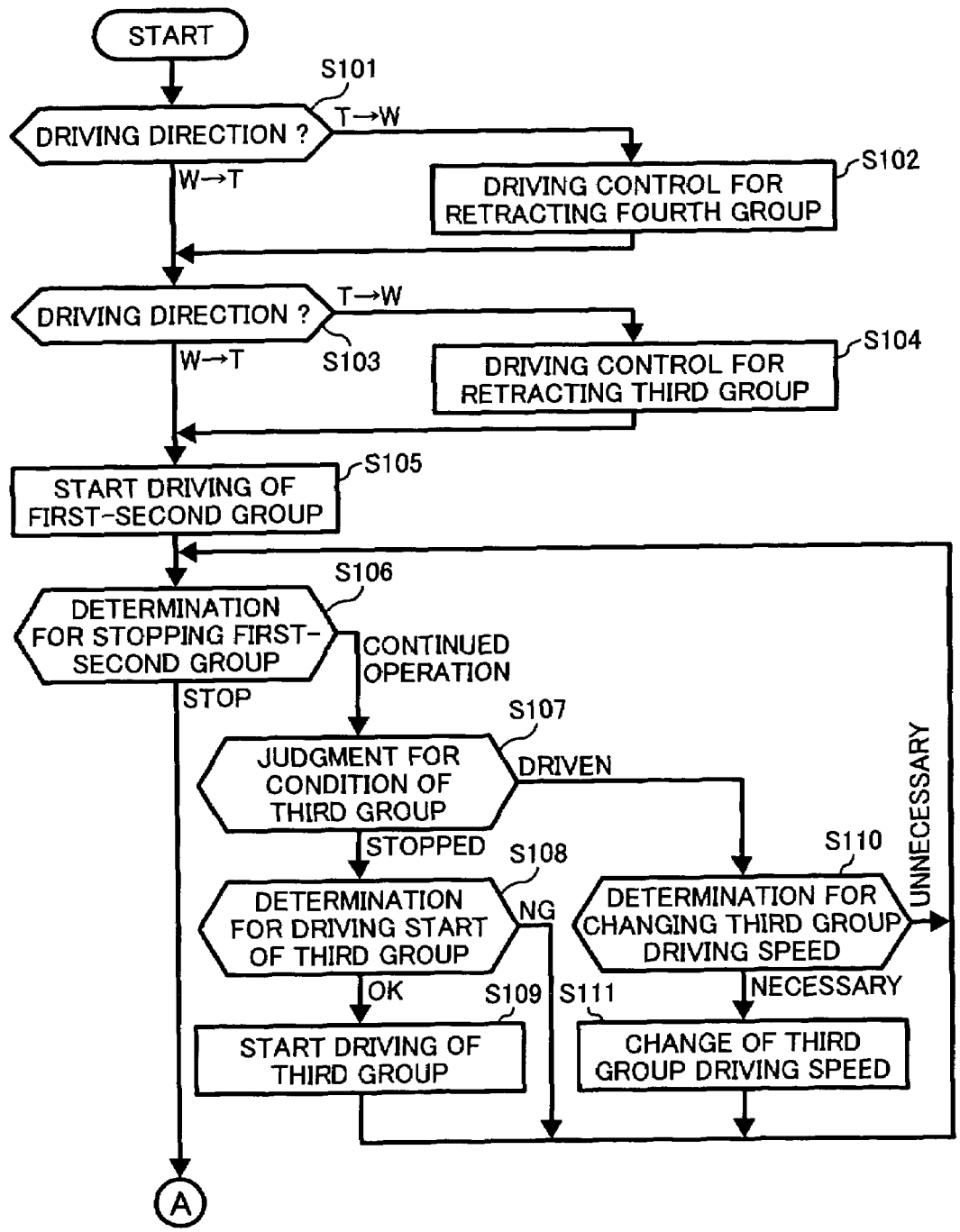
FIG. 3 is a flow chart showing the operations of the first embodiment of the present invention.
Figure 3B:
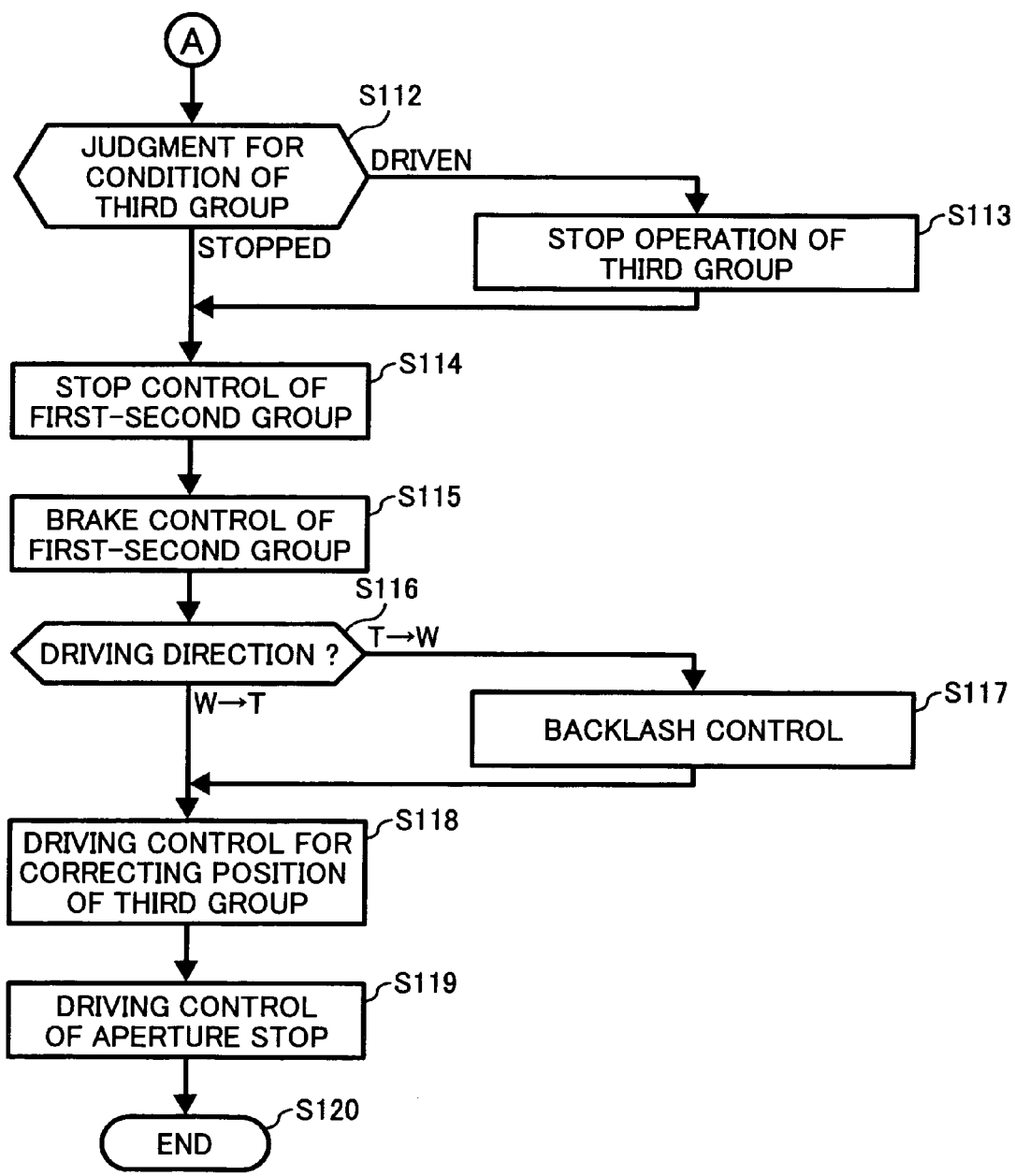

Differences between the present embodiment and the first embodiment are only the contents of Step S110 and Step S111 in the flowchart of FIG. 3. Thus, hereinafter, the contents of Step S110 and Step S111 in the present embodiment will be explained.

At Step S110, the driving speed of the first-second group 1A is examined, and it is determined whether the driving speed of the third group 1B should be changed or not, in order to avoid the interference between the first-second group 1A and the third group 1B. If the driving speed of the first-second group 1A is changed at a predetermined speed or more, the flow moves to Step S111. On the contrary, if the driving speed of the first-second group 1A is not changed at a predetermined speed or more, the flow goes back to Step S106.

At Step S111, the driving speed of the third group 1B is changed with respect to the change in the driving speed of the first-second group 1A. Basically, the first-second group 1A is constantly driven at a design speed, but the driving speed is changed when a mechanical resistance value is increased/decreased, when load is applied from an exterior, and the like. Therefore, the driving speed of the third group 1B is changed depending on this speed change. In the present embodiment, the driving speed of the third group 1B is set to be changed in three stages such as low speed, medium speed and high speed with respect to the driving speed of the first-second group 1A.

The driving speed of the first-second group 1A can be obtained by measuring a pulse time for one cycle of output pulse of the first-second group moving amount detecting device 7. The driving speed of the third group 1B is determined depending on this pulse time. Basically, a reference driving speed of the third group 1B is calculated based on a pulse time in a stationary state (hereinafter, referred to as a stationary pulse time). This stationary pulse time is same as a design value; thus, the design value can be used. If the stationary pulse time exceeds a predetermined value (a first switching threshold, or underruns another predetermined value (a second switching threshold), it is determined that the driving speed of the first-second group 1A is changed at Step S110, and then the driving speed of the third group 1B is changed at Step S113.

In this case, the driving speed of the third group 1B can be set as follows, for example.

> Medium speed=1/(stationary pulse time×the number of pulses between zoom positions of first-second group 1A/the number of pulses between zoom positions of third group 1B)
>
> High speed=medium speed×stationary pulse time/first switching threshold
>
> Low speed=medium speed×stationary pulse time/second switching threshold With the above setting, if the pulse time for one cycle of the output pulse exceeds the first switching threshold (becomes lower than the first switching threshold) by the increased driving speed of the first-second group 1A, the driving speed of the third group 1B is switched from the medium speed to the high speed. If the pulse time for one cycle of the output pulse underruns the second switching threshold (becomes larger than the second switching threshold) by the reduced driving speed of the first-second group 1A, the driving speed of the third group 1B is switched from the medium speed to the low speed.

Figure 9:
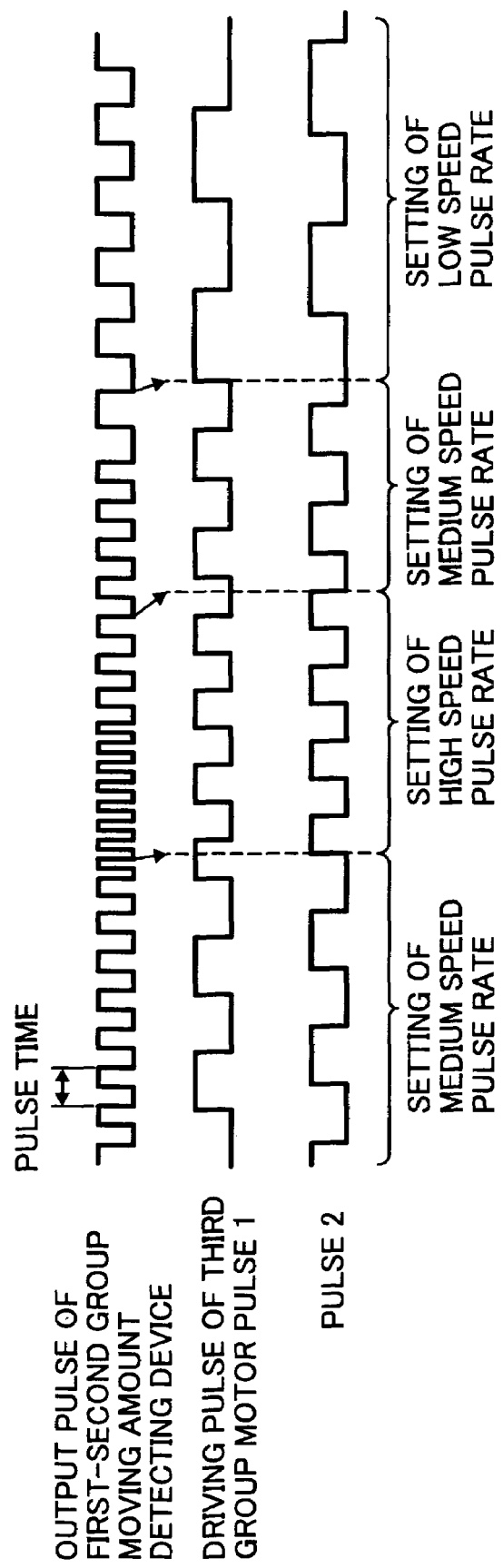
FIG. 9 is a timing chart of a second embodiment of the present invention.

FIG. 9 shows a timing chart for the output pulses of the first-second group moving amount detecting device 7 and the driving pulses to be input to the third group motor 4B. The third group motor 4B is a general two phase excitation pulse motor. Such a pulse motor is driven by the input of driving signals 1, 2 having a phase difference.

As illustrated in FIG. 9, if the output pulse rate of the first-second group motor 4A is increased by the change in the driving speed of the first-second group 1A, and the pulse time for one cycle of the output pulse of the first-second group moving amount detecting device 7 exceeds the first switching threshold (becomes lower than the first switching threshold), the driving speed of the third group 1B is switched from the medium speed to the high speed by increasing the pulse rates of the driving signals 1, 2 to be provided for the third group motor 4B. In addition, if the output pulse rates of the first-second group motor 4A is lowered by the change in the driving speed of the first-second group 1A, and the pulse time for one cycle of the output pulse of the first-second group moving amount detecting device 7 underruns the first switching threshold (becomes larger than the first switching threshold), the driving speed of the third group 1B is switched from the high speed to the medium speed by lowering the pulse rate of the driving pulses 1, 2 to be provided for the third group motor 4B. Furthermore, if the output pulse rate of the first-second group motor 4A is lowered by the change in the driving speed of the first-second group 1A, and the pulse time for one cycle of the output pulse of the first-second group moving amount detecting device 7 underruns the second switching threshold (becomes larger than the second switching threshold), the driving speed of the third group 1B is switched from the medium speed to the low speed by additionally lowering the pulse rates of the driving signals 1, 2 to be provided for the third group motor 4B.

As stated above, by changing the driving speed of the third group 1B corresponding to the change in the driving speed of the first-second group 1B, the interference between the first-second group 1A and the third group 1B can be avoided. The amount of acceleration/deceleration of the driving speed of the third group 1B is calculated by the CPU 5 based on the driving speed of the first-second group 1A, the position of first-second group 1A to be detected by the first-second group moving amount detecting device 7 and the position of the third group 1B to be calculated by the input pulse of the third group motor 4B, so as to avoid the interference between the first-second group 1A and the third group 1B.

As described above, the first-second group 1A and the third group 1B can be simultaneously driven by controlling the driving speed of the third group 1B based on the driving speed of the first-second group 1A while avoiding the interference between the first-second group 1A and the third group 1B.

In this case, if a method, which gives hysteresis for a control, is used, given that the first switching threshold and the second switching threshold of the first-second group 1A are different values when the driving speed of the third group 1B is switched to a faster speed and when the driving speed of the third group 1B is switched to a lower speed, the control can be smoothly performed.

For instance, hysteresis can be given to the control as follows.

> First switching threshold when switching from medium speed to high speed=stationary pulse time×0.7
>
> First switching threshold when switching from high speed to medium speed=stationary pulse time× 0.9
>
> Second switching threshold when switching from medium speed to low speed=stationary pulse time×1.3
>
> Second switching threshold when switching from low speed to medium speed=stationary pulse time× 1.1.

In addition, the above first switching threshold and the second switching threshold may be different values for a zoom driving direction and a zoom position.

In the present embodiment, the driving speed of the third group 1B has three stages, but the driving speed can be set to three stages or more.

Furthermore, the first embodiment and the present embodiment can be combined. More particularly, if the driving speed of the third group 1B is controlled depending on the driving speed of the first-second group 1A, and simultaneously the driving speed of the third group 1B is controlled by the positional relationship between the first-second group 1A and the third group 1B, more stabilized control of the third group 1B can be conducted.

Third Embodiment

Next, a fundamental operation of a third embodiment of the present invention will be explained with reference to the flowchart in FIG. 3 and the timing chart in FIG. 10.

The present embodiment shows a driving control method, which changes the driving speed of the third group 1B based on the driving speed of the first-second group 1A, and simultaneously drives the first-second group 1A and the third group 1B, so as to avoid the interference between the first-second group 1A and the third group 1B.

Here, differences between the present embodiment and the first embodiment are only the contents of Step S110 and Step S111 in the flowchart of FIG. 3; thus, hereinafter, the contents of Step S110 and Step S111 in the present embodiment will be explained.

At Step S110, the driving speed of the first-second group 1A is examined, and it is determined whether the driving speed of the third group 1B should be changed or not, in order to avoid the interference between the first-second group 1A and the third group 1B. If the driving speed of the first-second group 1A is changed at a predetermined value or more, the flow moves to Step S111. On the contrary, if the driving speed of the first-second group 1A is not changed at a predetermined value or more, the flow goes back to Step S106.

At Step S111, the driving speed of the third group 1B is changed with respect to the change in the driving speed of the first-second group 1A. Basically, the first-second group 1A is constantly driven at a design speed, but the driving speed is changed when a mechanical resistance value is increased/ decreased, load is applied from an exterior, and the like. Consequently, the driving speed of the third group 1B is changed depending on this speed change. In the present embodiment, the driving speed of the third group 1B is set to be changed in three stages such as low speed, medium speed and high speed, with respect to the driving speed of the first-second group 1A.

The driving speed of the first-second group 1A can be obtained by measuring a time, which is required when the first-second group 1A moves for one zoom position. The driving speed of the third group 1B is determined based on this time. Basically, a reference driving speed of the third group 1B is calculated based on the time in a stationary state (hereinafter, refereed to as a stationary time). The stationary time is same as a design value; thus, the design value can be used. If the stationary time exceeds a predetermined value (fist switching threshold), or underruns another predetermined value (second switching threshold), it is determined that the driving speed of the first-second group 1A is changed at Step S110, and then the driving speed of the third group 1B is changed at Step S111.

In this case, the driving speed of the third group 1B can be set as follows, for example.

Medium speed=1/(stationary time/the number of pulses between zoom positions of third group 1*B*)

High speed=medium speed×stationary time/first switching threshold

Low speed=medium speed×stationary time/second switching threshold

With the above setting, if the time when the first-second group 1A moves for one zoom position exceeds the first switching threshold by the increased driving speed of the first-second group 1A (becomes lower than the first switching threshold), the driving speed of the third group 1B is switched from the medium speed to the high speed. If the time when the first-second group 1A moves for one zoom position underruns the second switching threshold by the decelerated driving speed of the first-second group 1A (becomes larger than the second switching threshold), the driving speed of the third group 1B is switched from the medium speed to the low speed.

Figure 10:
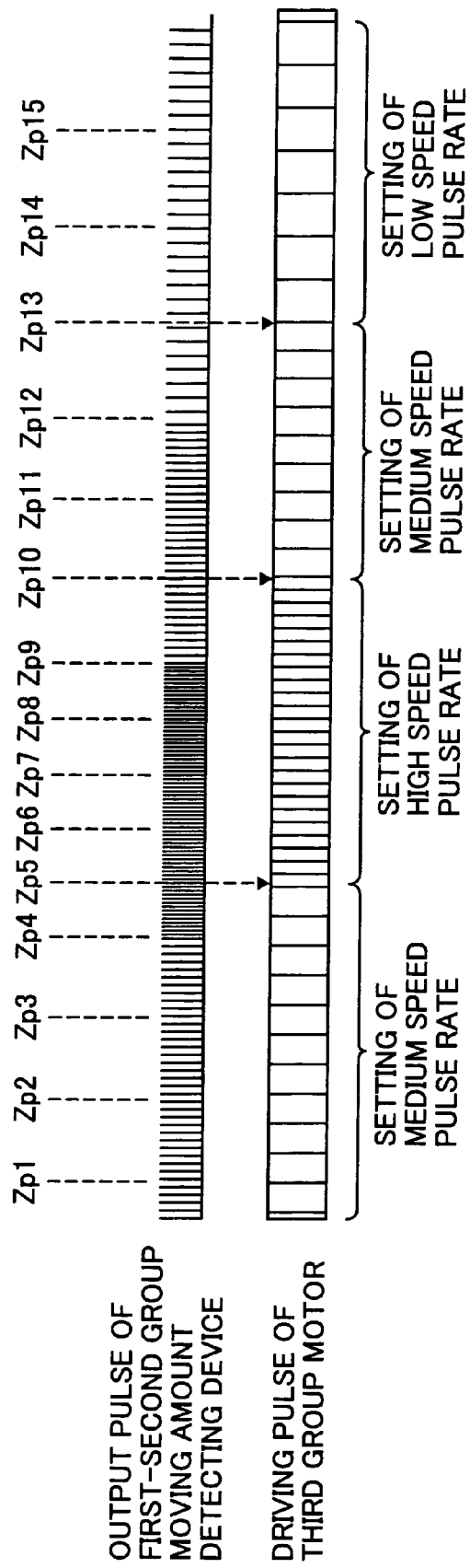
FIG. 10 is a timing chart of a third embodiment of the present invention.

FIG. 10 shows a timing chart of the output pulses of the first-second group moving amount detecting device 7 and the driving pulses to be input to the third group motor 4B.

As shown in FIG. 10, if the output pulse rate of the first-second group motor 4A is increased by the change in the diving speed of the first-second group 1A, and the time when the first-second group 1A moves for one zoom position exceeds the first switching threshold (becomes lower then the first threshold), the driving speed of the third group 1B is switched from the medium speed to the high speed by increasing the pulse rate to be provided for the third group motor 4B. In addition, if the output pulse rate of the first-second group motor 4A is lowered by the change in the driving speed of the first-second group 1A, and the time when the first-second group 1A moves for one zoom position underruns the first switching threshold (becomes larger than the first switching threshold), the driving speed of the third group 1B is switched from the high speed to the medium speed by lowering the pulse rate to be provided for the third group motor 4B. Furthermore, if the output pulse rate of the first-second group motor 4A is lowered by the change in the driving speed of the first-second group 1A, and the time when the first-second group 1A moves for one zoom position underruns the second switching threshold (becomes larger than the second switching threshold), the driving speed of the third group 1B is switched from the medium speed to the low speed by additionally lowering the pulse rate to be provided for the third group motor 4A.

As described above, it is possible to avoid the interference between the first-second group 1A and the third group 1B by changing the driving speed of the third group 1B corresponding to the change in the driving speed of the first-second group 1A. The amount of acceleration/deceleration of the driving speed of the third group 1B can be calculated by the CPU 5B based on the driving speed of the first-second group 1A, the position of the first-second group 1A to be detected by the first-second group driving amount detecting device 7 and the position of the third group 1B to be calculated by the input pulse of the third group motor 4B, so as to avoid the interference between the first-second group 1A and the third group 1B.

As stated above, the first-second group 1A and the third group 1B can be simultaneously driven while avoiding the interference between the first-second group 1A and the third group 1B by controlling the driving speed of the third group 1B based on the driving speed of the first-second group 1A.

In this case, if a method, which gives hysteresis for a control, is used, given that the first switching threshold and the second switching threshold of the first-second group 1A are different values when the driving speed of the third group 1B is switched to a faster speed and when the driving speed of the third group 1B is switched to a lower speed, the control can be smoothly performed.

For example, hysteresis can be given to the control as follows.

First switching threshold when switching from
medium speed to high speed=stationary time×0.7

First switching threshold when switching from high
speed to medium speed=stationary time×0.9

Second switching threshold when switching from
medium speed to low speed=stationary time×1.3

Second switching threshold when switching from low
speed to medium speed=stationary time=1.1

In addition, the above first switching threshold and the above second switching threshold can be set different values for a zoom driving direction and a zoom position.

In the present embodiment, the driving speed of the third group 1B has three stages, but the driving speed can be set to three stages or more.

Moreover, in the present embodiment, the speed measurement of the first-second group is performed for one zoom position, but one zoom position can be divided into more detailed zoom steps to perform the speed measurement for the one zoom step; thereby, the following capability of the third group with respect to the first-second group can be further improved.

Furthermore, the first embodiment and the present embodiment may be combined. More particularly, if the driving speed of the third group 1B is controlled depending on the driving speed of the first-second group 1A, and simultaneously the driving speed of the third group 1B is controlled based on the positional relationship between the first-second group 1A and the third group 1B, more stabilized control of the third group 1B can be conducted.

Fourth Embodiment

Figure 11A:
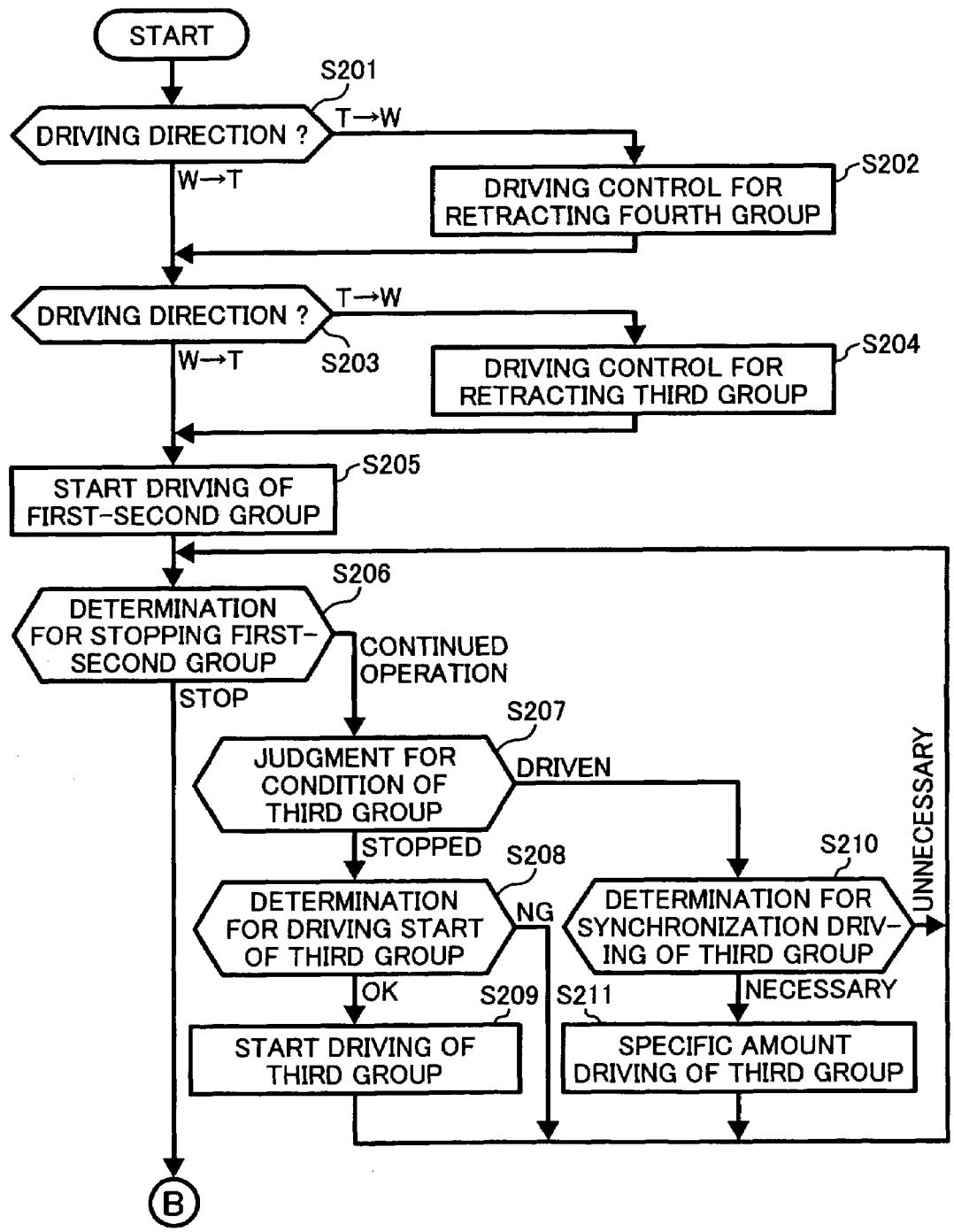
FIG. 11 is a flow chart showing operations of a fourth embodiment of the present invention.
Figure 11B:
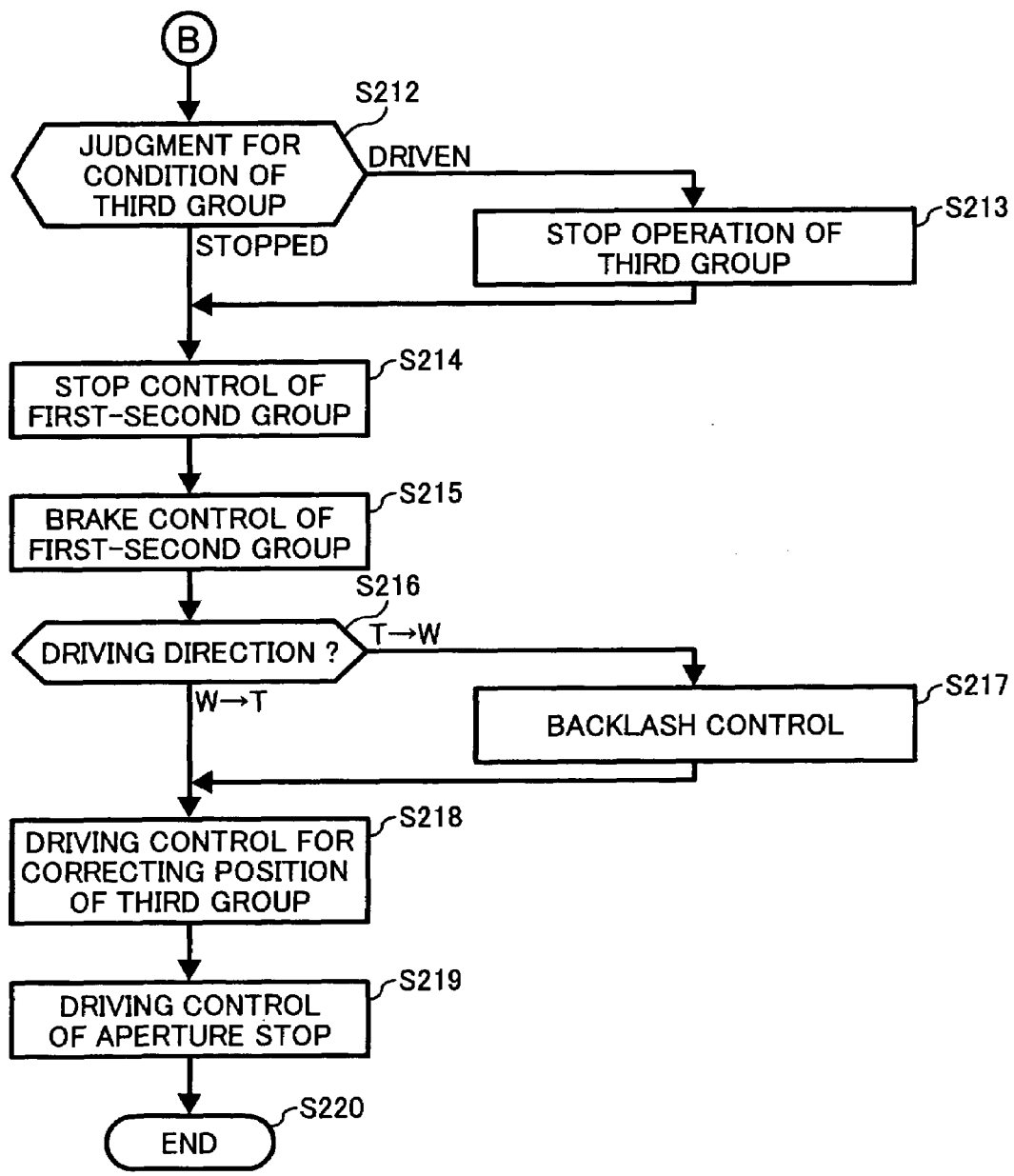
Figure 13:
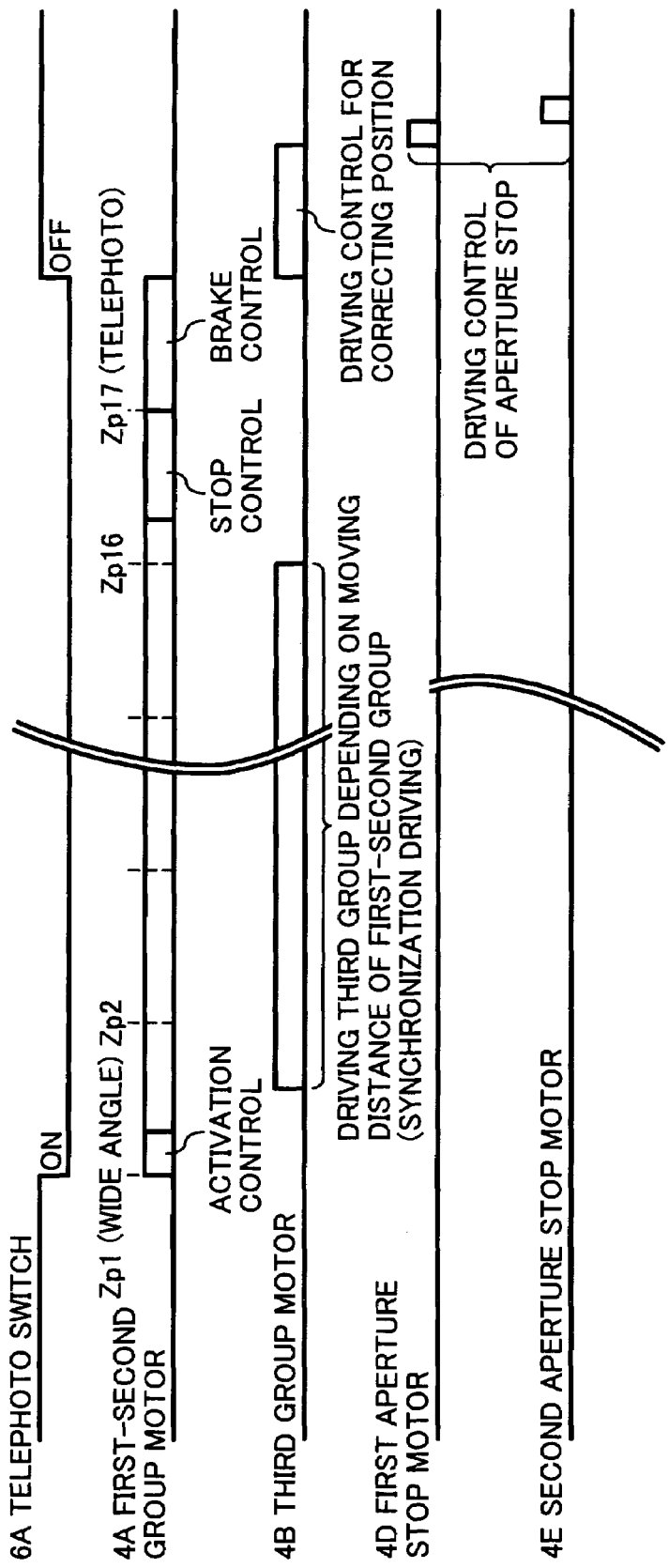
FIG. 13 is another timing chart of the fourth embodiment of the present invention.
Figure 14:
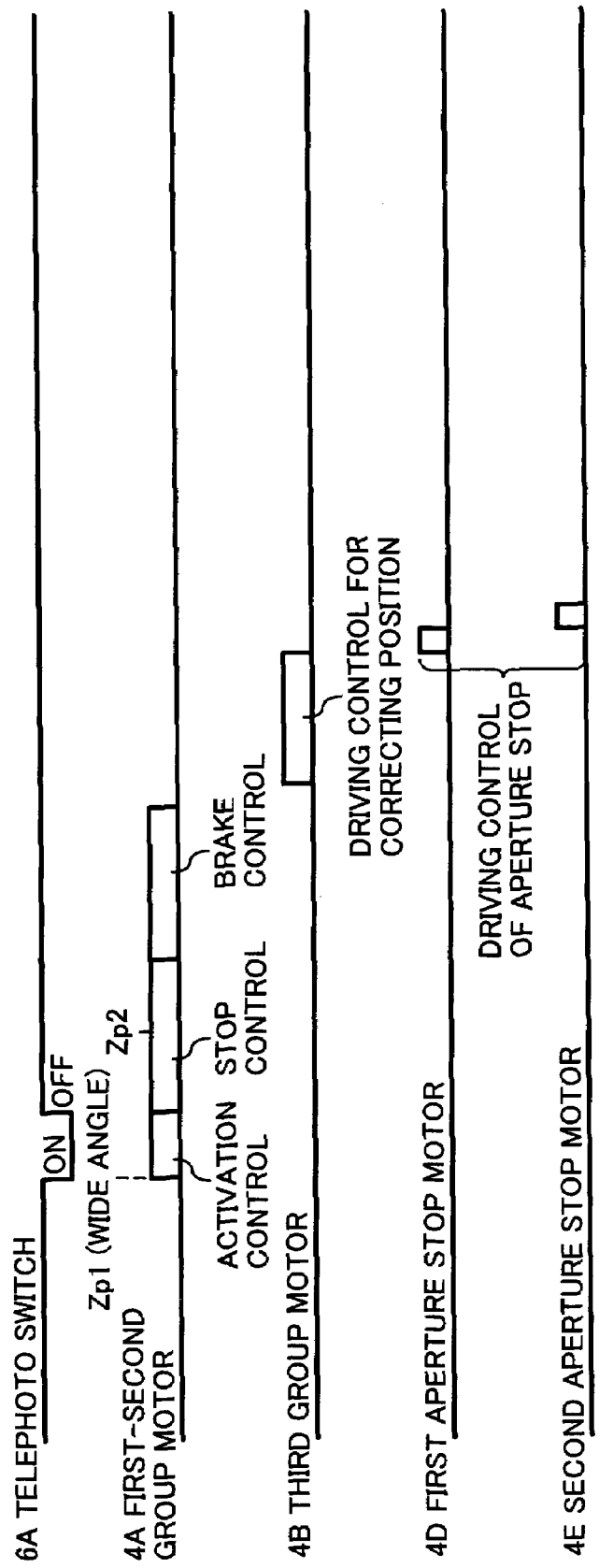
FIG. 14 is another timing chart of the fourth embodiment of the present invention.
Figure 15:
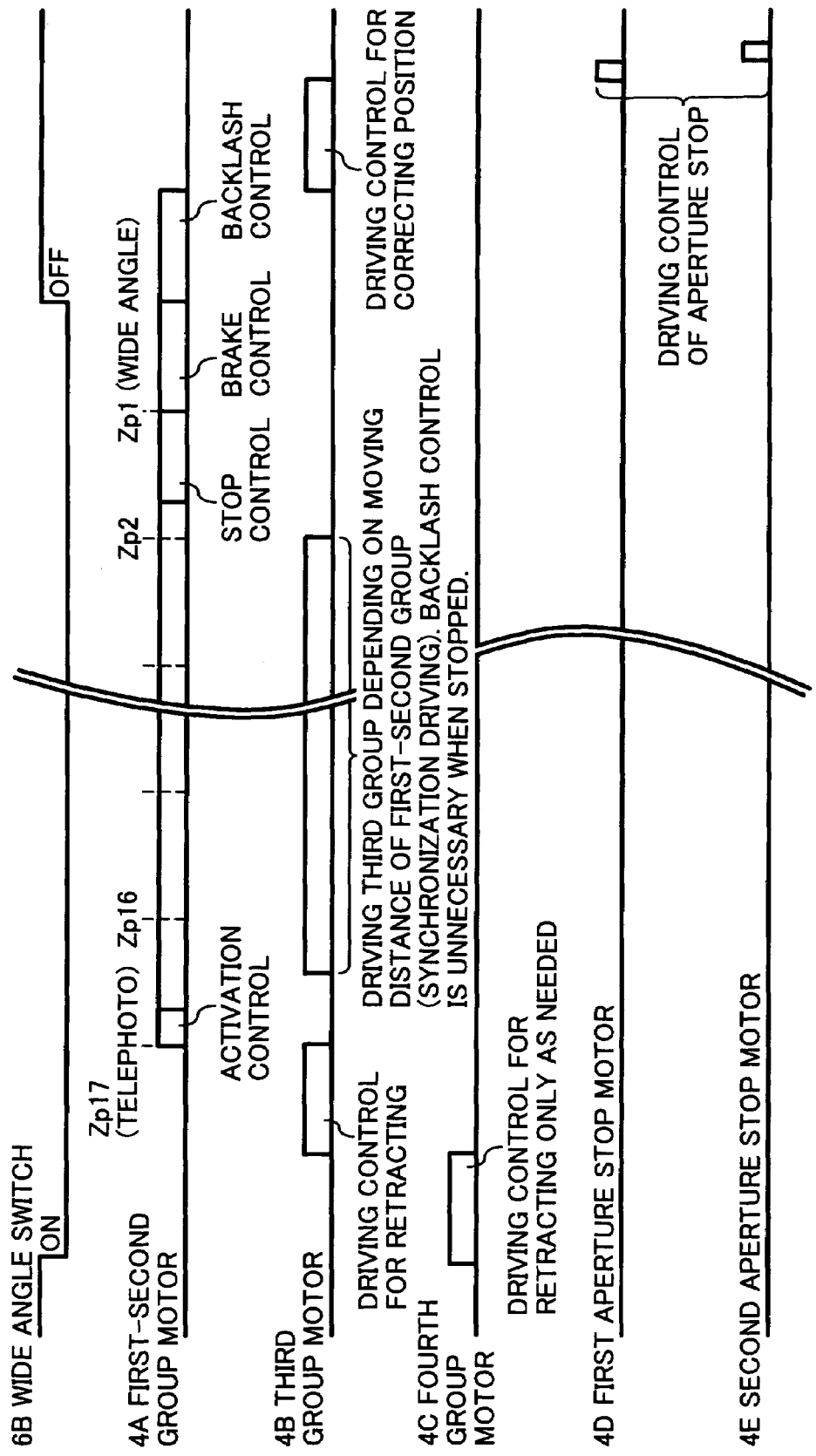
FIG. 15 is another timing chart of the fourth embodiment of the present invention.

Next, a fundamental operation of a fourth embodiment of the present invention will be explained with reference to the flow chart in FIG. 11 and the timing charts in FIGS. 12-16.

The present embodiment shows a driving control method, which changes the driving amount of the third group 1B based on the moving distance of the first-second group 1A, and drives simultaneously the first-second group 1A and the third group 1B, so as to avoid the interference between the first-second group 1A and the third group 1B.

Here, differences between the present embodiment and the first embodiment are only the contents of Step S210 and Step S211 of the flowchart in FIG. 11; thus, hereinafter, the contents of Step S210 and Step S211 in the present embodiment will be explained.

At Step S210, the moving distance of the first-second group 1A is examined, and it is determined whether the third group 1B should be synchronized to the first-second group 1A to drive the third group 1B at a predetermined amount, so as to avoid the interference between the first-second group 1A and the third group 1B. If the first-second group 1A is driven at a prescribed amount, the flow moves to Step S211. On the contrary, if the first-second group 1A is not driven at a prescribed amount, the flow goes back to Step S206.

At Step S211, the third group 1B is driven at a predetermined amount.

FIG. 12 illustrates a timing chart of the output pulse of the first-second moving amount detecting device 7 and the driving signals 1, 2 to be input to the third group motor 4B. FIGS. 13-16 show timing charts of the entire operation. The timing charts of FIGS. 13-16 are the same as the timing charts of FIGS. 4-7 in the first embodiment; thus, the explanations thereof are omitted.

As illustrated in FIG. 12, in the present embodiment, the phases of the driving pulses to be input to the third group motor 4B are switched for every four output pulses of the first-second group moving amount detecting device 7, and the third group 1B is driven by one pulse. By controlling the driving as described above, whenever the first-second group 1A is driven at a prescribed amount, the third group 1B is driven at a constant amount without depending on the driving speed of the first-second group 1A. Therefore the interval between the first-second group 1A and the third group 1B can be maintained in a predetermined amount.

As shown in FIG. 2, the number of output pulses of the first-second group moving amount detecting device 7 for one zoom position is 80, and the number of input pulses of the third group motor 1B required for moving the third group 1B for one zoom position is set to 20; thereby, the pulse ratio when the first-second group 1A and the third group 1B move for one zoom position is 4:1. Therefore, if the phases of the driving pulses to be input to the third group motor 4B are switched for every four pulses of the number of pulses to be output by the first-second group moving amount detecting device 7, and the third group is driven by one pulse, the first-second group 1A and the third group 1B can be driven while maintaining a predetermined interval between the first-second group 1A and the third group 1B.

As stated above, the first-second group 1A and the third group 1B can be simultaneously synchronously driven by controlling the driving amount of the third group 1B based on the moving distance of the first-second group 1A while avoiding the interference between the first-second group 1A and the third group 1B.

In addition, if an upper limit value is set to the pulse rates of the driving signals 1, 2 of the third group 1B, the step-out (idle) of the third group motor 4B by over speed can be prevented.

In the present embodiment, the third group 1B is synchronously driven by one pulse for every four output pulses of the first-second moving amount detecting device 7, but the number of output pulses of the first-second group moving amount detecting device 7 when the third group 1B is synchronously driven can be varied by a zoom drive direction and for zoom positions. In FIG. 12, the amount of synchronous driving of the third group 1B is one pulse of the driving signal to the third group motor 4B, the amount synchronous driving can be varied by a zoom driving direction and for zoom positions. For example, the third group 1B can be driven by two pulses for every eight output pulses of the first-second group moving amount detecting device 7.

As described in the first embodiment to the fourth embodiment, in a photographing lens comprising a plurality of lens groups, based on a position and speed of a lens group in an object side, a driving speed or a driving amount of a lens group other than the lens group in the object side is changed, and the lens group in the object side and the lens group other than the lens group in the object side are simultaneously driven. Therefore, a target optical system can be achieved, so as to avoid the interference of each of the lens groups.

According to the present invention, in the photographing lens comprising a plurality of lens groups, each of the lens groups is simultaneously driven by a motor without generating the interference between each of the lens groups, so as to accomplish a photographing lens driving control device, which achieves a target optical system in a short time.

Since each of the lens groups is simultaneously driven, a target optical system can be achieved in a short time. Accordingly, if the present invention is applied to a digital camera having a liquid crystal display, an image out of focus is not displayed on the liquid crystal display for a long time; thereby, merchantability can be improved.

In addition, since each of the lens groups is driven by a motor, a complicated driving mechanism is unnecessary, which is required when driving a plurality of lens groups by one motor; thereby, a required optical system can be achieved with a simple structure.

As described above, the embodiments of the present invention are described with reference to the drawings, but these embodiments are the examples of the present invention. Therefore, the present invention is not limited to the structures of the embodiments, and various changes in form and details may be made in the present invention without departing from the sprit and scope of the present invention.

For example, the driving control, which drives three lens groups by three motors, is explained in the first embodiment to the fourth embodiment, but the number of the lens groups to be driven and controlled and the number of the motors are not limited thereto. The present invention can be applied to more lens groups.

In addition, the values of the output pulses of the first-second group moving amount detecting device 7 and the values of the input pulses to the third group motor 4B are not limited to the values shown in FIG. 2. Each of the values can be set to another value, if the value is appropriate to the operations of the present invention.

What is claimed is:

1. A photographing lens driving control device, comprising:

a plurality of lens groups having a magnification function, at least one of which being positioned on an object side relative to others of the plurality of lens groups;

a plurality of lens driving devices configured to drive the plurality of lens groups; and a control device configured to control the plurality of lens driving devices, wherein when driving the at least one lens group, the control device detects a position of another lens group with respect to a position of the at least one lens group, and adjusts a driving speed of the another lens group depending on the detected position of the another lens group with respect to the position of the at least one lens group, when the position of the another lens group approaches the at least one lens group beyond a first predetermined position, the control device adjusts the driving speed of the another lens group to maintain a distance between the another lens group and the at least one lens group, and when the position of the another lens group is at least at a second predetermined position relative to the at least one lens group, the control device adjusts the driving speed of the another lens group such that the distance between the another lens group and the at least one lens group does not increase, the second predetermined position being beyond the first predetermined position relative to the at least one lens group, the first predetermined position is calculated based on a first position of the another lens group and a first margin amount, said first position of the another lens group corresponding to the position of the at least one lens group, the second predetermined position is calculated based on a second position of the another lens group and a second margin amount, said second position of the another lens group corresponding to the position of the at least one lens group, and the first and the second predetermined positions are updated according to the position of the at least one lens group.

2. The photographing lens driving control device according to claim 1, the lens driving device of the at least one lens group is a direct current motor, and the lens driving device of the another lens group is a pulse motor.

* * * * *